United States Patent
Asgar et al.

(10) Patent No.: US 12,190,179 B2
(45) Date of Patent: *Jan. 7, 2025

(54) AUTOMATION SOLUTIONS FOR EVENT LOGGING AND DEBUGGING ON KUBERNETES

(71) Applicant: New Relic, Inc., San Francisco, CA (US)

(72) Inventors: Zain Mohamed Asgar, San Francisco, CA (US); Omid Jalal Azizi, San Francisco, CA (US); James Michael Bartlett, San Francisco, CA (US); Ruizhe Cheng, San Francisco, CA (US); Phillip Kuznetsov, San Francisco, CA (US); Ishan Mukherjee, San Francisco, CA (US); Michelle Aimi Nguyen, San Francisco, CA (US); Natalie Grace Serrino, San Francisco, CA (US); Yaxiong Zhao, San Francisco, CA (US)

(73) Assignee: New Relic, Inc., San Francisco, CA (US)

( * ) Notice: Subject to any disclaimer, the term of this patent is extended or adjusted under 35 U.S.C. 154(b) by 489 days.

This patent is subject to a terminal disclaimer.

(21) Appl. No.: 17/525,767

(22) Filed: Nov. 12, 2021

(65) Prior Publication Data

US 2022/0147434 A1    May 12, 2022

Related U.S. Application Data

(60) Provisional application No. 63/113,112, filed on Nov. 12, 2020.

(51) Int. Cl.
    *G06F 16/00* (2019.01)
    *G06F 8/60* (2018.01)
    (Continued)

(52) U.S. Cl.
    CPC ............... *G06F 9/545* (2013.01); *G06F 8/60* (2013.01); *G06F 9/542* (2013.01);
    (Continued)

(58) Field of Classification Search
    None
    See application file for complete search history.

(56) References Cited

U.S. PATENT DOCUMENTS

| | | |
|---|---|---|
| 9,722,879 B1 | 8/2017 | Muthu |
| 10,747,875 B1 | 8/2020 | Stoler |

(Continued)

OTHER PUBLICATIONS

Asgar, Zain Mohamed; Final Office Action for U.S. Appl. No. 17/525,749, filed Nov. 12, 2021, mailed Aug. 25, 2023, 15 pgs.

(Continued)

*Primary Examiner* — Hasanul Mobin
(74) *Attorney, Agent, or Firm* — Taylor English Duma LLP

(57) ABSTRACT

Automation solutions for event logging and debugging on KUBERNETES are disclosed. A system for event logging and debugging on a distributed application cluster includes a user interface and at least one processor for executing instructions. The instructions, when executed, instruct the at least one processor to provide an edge module configured to deploy a Berkeley Packet Filter (BPF) probe and a BPF program in a computing environment. The BPF probe is triggered based on an event associated with a distributed application running in a user space of the computing environment. Data associated with the event is collected in a kernel space of the computing environment via the BPF program and transferred from the BPF program to the edge module. A query request associated with the collected data is sent to the edge module. A response corresponding to the collected data is received at the user interface.

18 Claims, 19 Drawing Sheets

(51) Int. Cl.
  *G06F 9/54*      (2006.01)
  *G06F 11/07*     (2006.01)
  *G06F 11/30*     (2006.01)
  *G06F 11/32*     (2006.01)
  *G06F 11/34*     (2006.01)
  *G06F 11/36*     (2006.01)
  *G06F 16/2455*   (2019.01)
  *G06F 16/26*     (2019.01)
  *G06F 16/28*     (2019.01)
  *G06N 5/02*      (2023.01)
  *G06N 20/00*     (2019.01)
  *H04L 9/40*      (2022.01)

(52) U.S. Cl.
  CPC ...... *G06F 11/0709* (2013.01); *G06F 11/3006* (2013.01); *G06F 11/3089* (2013.01); *G06F 11/3093* (2013.01); *G06F 11/323* (2013.01); *G06F 11/3476* (2013.01); *G06F 11/3495* (2013.01); *G06F 11/362* (2013.01); *G06F 16/2455* (2019.01); *G06F 16/26* (2019.01); *G06F 16/285* (2019.01); *G06N 5/02* (2013.01); *G06N 20/00* (2019.01); *H04L 63/02* (2013.01); *G06F 2201/86* (2013.01)

(56) References Cited

U.S. PATENT DOCUMENTS

| | | | |
|---|---|---|---|
| 10,791,168 B1* | 9/2020 | Dilley | H04L 67/288 |
| 10,992,652 B2* | 4/2021 | Putatunda | H04L 63/1408 |
| 11,574,242 B1 | 2/2023 | Burke et al. | |
| 11,709,720 B1 | 7/2023 | Fournier | |
| 11,977,934 B2 | 5/2024 | Asgar et al. | |
| 12,045,676 B2 | 7/2024 | Asgar et al. | |
| 2002/0007468 A1 | 1/2002 | Kampe et al. | |
| 2002/0019870 A1 | 2/2002 | Chirashnya et al. | |
| 2002/0174218 A1* | 11/2002 | Dick | G06F 9/542 709/224 |
| 2003/0028509 A1 | 2/2003 | Sah et al. | |
| 2003/0220740 A1 | 11/2003 | Intriligator et al. | |
| 2003/0220984 A1 | 11/2003 | Jones et al. | |
| 2005/0210133 A1 | 9/2005 | Florissi et al. | |
| 2006/0056285 A1 | 3/2006 | Krajewski et al. | |
| 2006/0092179 A1 | 5/2006 | Sumizawa et al. | |
| 2006/0182034 A1 | 8/2006 | Klinker et al. | |
| 2007/0156919 A1* | 7/2007 | Potti | H04L 63/12 709/238 |
| 2009/0287791 A1 | 11/2009 | Mackey | |
| 2011/0145639 A1* | 6/2011 | Farahmand | H04L 67/1034 714/25 |
| 2012/0215779 A1* | 8/2012 | Lipstone | G06F 16/24556 707/E17.089 |
| 2013/0054603 A1 | 2/2013 | Birdwell et al. | |
| 2013/0097320 A1 | 4/2013 | Ritter et al. | |
| 2013/0211546 A1* | 8/2013 | Lawson | H04L 67/02 700/9 |
| 2014/0040275 A1 | 2/2014 | Dang et al. | |
| 2014/0136726 A1 | 5/2014 | Van Wie et al. | |
| 2014/0181274 A1 | 6/2014 | Bazin et al. | |
| 2014/0359719 A1 | 12/2014 | Iida | |
| 2014/0379901 A1 | 12/2014 | Tseitlin et al. | |
| 2015/0019553 A1 | 1/2015 | Shaashua et al. | |
| 2015/0261886 A1 | 9/2015 | Wu et al. | |
| 2015/0293660 A1 | 10/2015 | Chiu | |
| 2015/0363702 A1 | 12/2015 | Baum | |
| 2016/0026919 A1 | 1/2016 | Kaisser et al. | |
| 2018/0121843 A1* | 5/2018 | Connely, IV | H04W 12/02 |
| 2018/0285744 A1 | 10/2018 | Kang | |
| 2019/0140983 A1* | 5/2019 | Tu | H04L 69/22 |
| 2019/0173841 A1* | 6/2019 | Wang | G06F 9/5083 |
| 2019/0324882 A1 | 10/2019 | Borello et al. | |
| 2020/0014663 A1* | 1/2020 | Chen | G06F 9/45558 |
| 2020/0026859 A1 | 1/2020 | Sun et al. | |
| 2020/0145337 A1 | 5/2020 | Keating et al. | |
| 2020/0175156 A1 | 6/2020 | Bhamidipati et al. | |
| 2020/0177372 A1 | 6/2020 | Bhamidipati et al. | |
| 2020/0193017 A1 | 6/2020 | Bannister et al. | |
| 2020/0220794 A1* | 7/2020 | Barabash | H04L 43/022 |
| 2020/0389531 A1 | 12/2020 | Lee et al. | |
| 2020/0409780 A1 | 12/2020 | Balasubramanian et al. | |
| 2021/0058424 A1 | 2/2021 | Chang et al. | |
| 2022/0147407 A1 | 5/2022 | Asgar et al. | |
| 2022/0147408 A1 | 5/2022 | Asgar et al. | |
| 2022/0147433 A1 | 5/2022 | Asgar et al. | |
| 2022/0147542 A1 | 5/2022 | Asgar et al. | |
| 2023/0104007 A1 | 4/2023 | Viswambharan et al. | |
| 2023/0168986 A1 | 6/2023 | Larkin et al. | |
| 2023/0231830 A1 | 7/2023 | Shin et al. | |

OTHER PUBLICATIONS

Asgar, Zain Mohamed; Non-Final Office Action for U.S. Appl. No. 17/525,749, filed Nov. 12, 2021, mailed Feb. 28, 2023, 17 pgs.
Asgar, Zain Mohamed; Notice of Allowance for U.S. Appl. No. 17/525,749, filed Nov. 12, 2021, mailed Jan. 29, 2024, 13 pgs.
Asgar, Zain Mohamed; Issue Notification for U.S. Appl. No. 17/525,755, filed Nov. 12, 2021, mailed Mar. 13, 2024, 2 pgs.
Asgar, Zain Mohamed; Non-Final Office Action for U.S. Appl. No. 17/525,755, filed Nov. 12, 2021, mailed Mar. 10, 2023, 22 pgs.
Asgar, Zain Mohamed; Notice of Allowance for U.S. Appl. No. 17/525,755, filed Nov. 12, 2021, mailed Dec. 28, 2023, 13 pgs.
Asgar, Zain Mohamed; Notice of Allowance for U.S. Appl. No. 17/525,755, filed Nov. 12, 2021, mailed Sep. 8, 2023, 11 pgs.
Asgar, Zain Mohamed; Non-Final Office Action for U.S. Appl. No. 17/525,757, filed Nov. 12, 2021, mailed Sep. 21, 2023, 20 pgs.
Asgar, Zain Mohamed; Issue Notification for U.S. Appl. No. 17/525,749, filed Nov. 12, 2021, mailed Apr. 17, 2024, 2 pgs.
Asgar, Zain Mohamed; Notice of Allowance for U.S. Appl. No. 17/525,755, filed Nov. 12, 2021, mailed May 6, 2024, 12 pgs.
Asgar, Zain Mohamed; Final Office Action for U.S. Appl. No. 17/525,757, filed Nov. 12, 2021, mailed Apr. 29, 2024, 30 pgs.
Asgar, Zain Mohamed; Non-Final Office Action for U.S. Appl. No. 17/525,760, filed Nov. 12, 2021, mailed May 22, 2024, 21 pgs.
Asgar, Zain Mohamed; Issue Notification for U.S. Appl. No. 17/525,755, filed Nov. 12, 2021, mailed Jul. 3, 2024, 2 pgs.
Asgar, Zain Mohamed; Non-Final Office Action for U.S. Appl. No. 17/525,757, filed Nov. 12, 2021, mailed Aug. 21, 2024, 26 pgs.
Asgar, Zain Mohamed; Notice of Allowance for U.S. Appl. No. 17/525,760, filed Nov. 12, 2021, mailed Oct. 1, 2024, 17 pgs.
Asgar, Zain Mohamed; Notice of Allowance for U.S. Appl. No. 17/525,757, filed Nov. 12, 2021, mailed Nov. 20, 2024, 14 pgs.

* cited by examiner

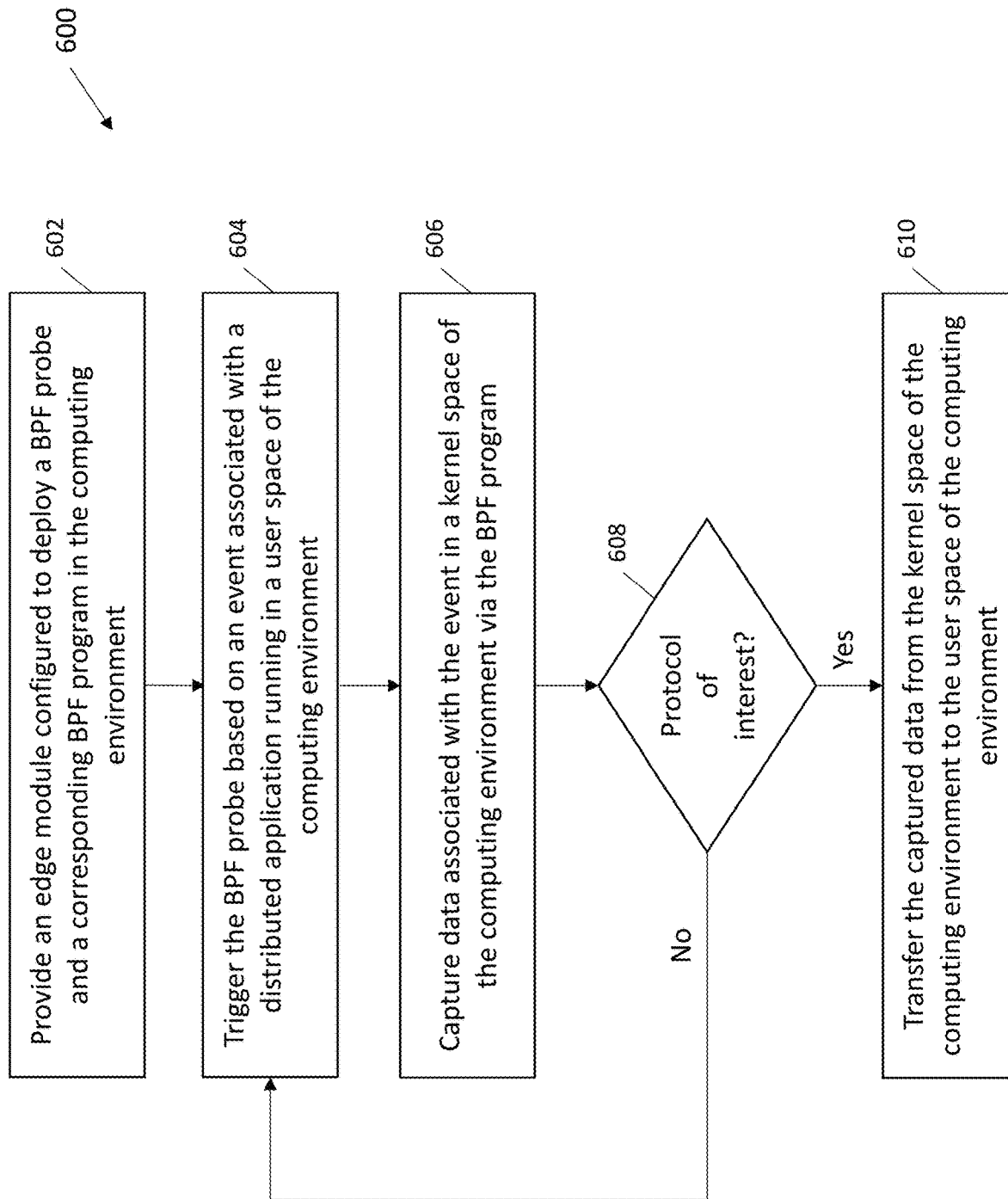

AUTOMATION SOLUTIONS FOR EVENT LOGGING AND DEBUGGING ON KUBERNETES

CROSS-REFERENCE TO RELATED APPLICATIONS

This application claims priority and benefit from U.S. Provisional Application No. 63/113,112, titled "AUTOMATION SOLUTIONS FOR EVENT LOGGING AND DEBUGGING ON KUBERNETES" and filed on Nov. 12, 2020, which is hereby incorporated by reference herein in its entirety.

FIELD

The present disclosure is related to the field of event logging and debugging on container orchestration platforms, and more specifically, for automated event logging and debugging on KUBERNETES.

BACKGROUND

Many modern software applications are built using distributed software architectures rather than traditional monolithic paradigms. Distributed software architectures often have complex designs where one software application is implemented as numerous containerized microservices. Multiple instances of the containers may be hosted by many different computing nodes in a cluster of computing nodes. The number of instances of the containers deployed within the cluster may vary on a per-container basis responsive to throughput of (e.g., demand for) the one or more microservices within the container, and can vary over time. Container orchestration systems automate deployment, scaling, and management of the software application upon the cluster. Real-time or near real-time visualization of the cluster and its often-changing components, particularly to monitor performance, can be difficult.

SUMMARY

Automation solutions for event logging and debugging on KUBERNETES are disclosed. Automation solutions for event logging and debugging on KUBERNETES are disclosed. A system for event logging and debugging on a distributed application cluster includes a user interface and at least one processor for executing instructions. The instructions, when executed, instruct the at least one processor to provide an edge module configured to deploy a Berkeley Packet Filter (BPF) probe and a BPF program in a computing environment. The BPF probe is triggered based on an event associated with a distributed application running in a user space of the computing environment. Data associated with the event is collected in a kernel space of the computing environment via the BPF program and transferred from the BPF program to the edge module. A query request associated with the collected data is sent to the edge module. A response corresponding to the collected data is received at the user interface.

At least one aspect of the present disclosure is directed to a system for event logging and debugging on a distributed application cluster. The system includes a user interface, at least one memory storing computer-executable instructions, and at least one processor for executing the computer-executable instructions stored in the memory. The instructions, when executed, instruct the at least one processor to: provide an edge module configured to deploy a Berkeley Packet Filter (BPF) probe and a corresponding BPF program in a computing environment, trigger the BPF probe based on an event associated with a distributed application running in a user space of the computing environment, collect data associated with the event in a kernel space of the computing environment via the BPF program, transfer the collected data from the BPF program to the edge module, send, via the user interface, a query request associated with the collected data to the edge module, and receive, at the user interface, a response corresponding to the collected data from the edge module.

In one embodiment, the response corresponding to the collected data includes at least a portion of the collected data. In some embodiments, the system includes a cloud service and the instructions, when executed, instruct the at least one processor to: query, via the cloud service, an address associated with the distributed application, and request, via the user interface, the address associated with the distributed application from the cloud service. In various embodiments, the address associated with the distributed application is an IP address of the computing environment. In certain embodiments, sending the query request associated with the collected data to the edge module includes sending the query request to the address associated with the distributed application. In various embodiments, the user interface and the distributed application are on a first side of a firewall and the cloud service is on a second side of the firewall.

In some embodiments, sending the query request associated with the collected data to the edge module includes sending the query request to a cloud service configured to communicate with the edge module. In one embodiment, receiving the response corresponding to the collected data from the edge module includes receiving the response from the cloud service in communication with the edge module. In various embodiments, the cloud service can receive query requests and/or send responses over networks other than a network shared between the distributed application and the user interface. In certain embodiments, the instructions, when executed, instruct the at least one processor to generate at least one of a data table and a graphical visualization based on the received response corresponding to the collected data.

Another aspect of the present disclosure is directed to a method for event logging and debugging on a distributed application cluster. The method includes providing an edge module configured to deploy a Berkeley Packet Filter (BPF) probe and a corresponding BPF program in a computing environment, triggering the BPF probe based on an event associated with a distributed application running in a user space of the computing environment, collecting data associated with the event in a kernel space of the computing environment via the BPF program, transferring the collected data from the BPF program to the edge module, sending, via a user interface, a query request associated with the collected data to the edge module, and receiving, at the user interface, a response corresponding to the collected data from the edge module.

In one embodiment, the response corresponding to the collected data includes at least a portion of the collected data. In some embodiments, the method includes querying, via a cloud service, an address associated with the distributed application, and requesting, via the user interface, the address associated with the distributed application from the cloud service. In various embodiments, the address associated with the distributed application is an IP address of the computing environment. In certain embodiments, sending the query request associated with the collected data to the edge module includes sending the query request to the address associated with the distributed application.

In some embodiments, the user interface and the distributed application are on a first side of a firewall and the cloud service is on a second side of the firewall. In one embodiment, sending the query request associated with the collected data to the edge module includes sending the query request to a cloud service configured to communicate with the edge module. In certain embodiments, receiving the response corresponding to the collected data from the edge module includes receiving the response from the cloud service in communication with the edge module. In various embodiments, the cloud service can receive query requests and/or send responses over networks other than a network shared between the distributed application and the user interface. In some embodiments, the method includes generating at least one of a data table and a graphical visualization based on the received response corresponding to the collected data.

BRIEF DESCRIPTION OF THE DRAWINGS

The accompanying figures, which are included as part of the present specification, illustrate the presently preferred embodiments and together with the general description given above and the detailed description of the preferred embodiments given below serve to explain and teach the principles described herein.

FIG. 6 is a flow diagram of a protocol tracing method in accordance with aspects described herein.

DETAILED DESCRIPTION

Disclosed herein are exemplary embodiments of systems and methods for providing automation solutions for event logging and debugging on container orchestration platforms, and more specifically, for event logging and debugging on KUBERNETES.

Figure 1:
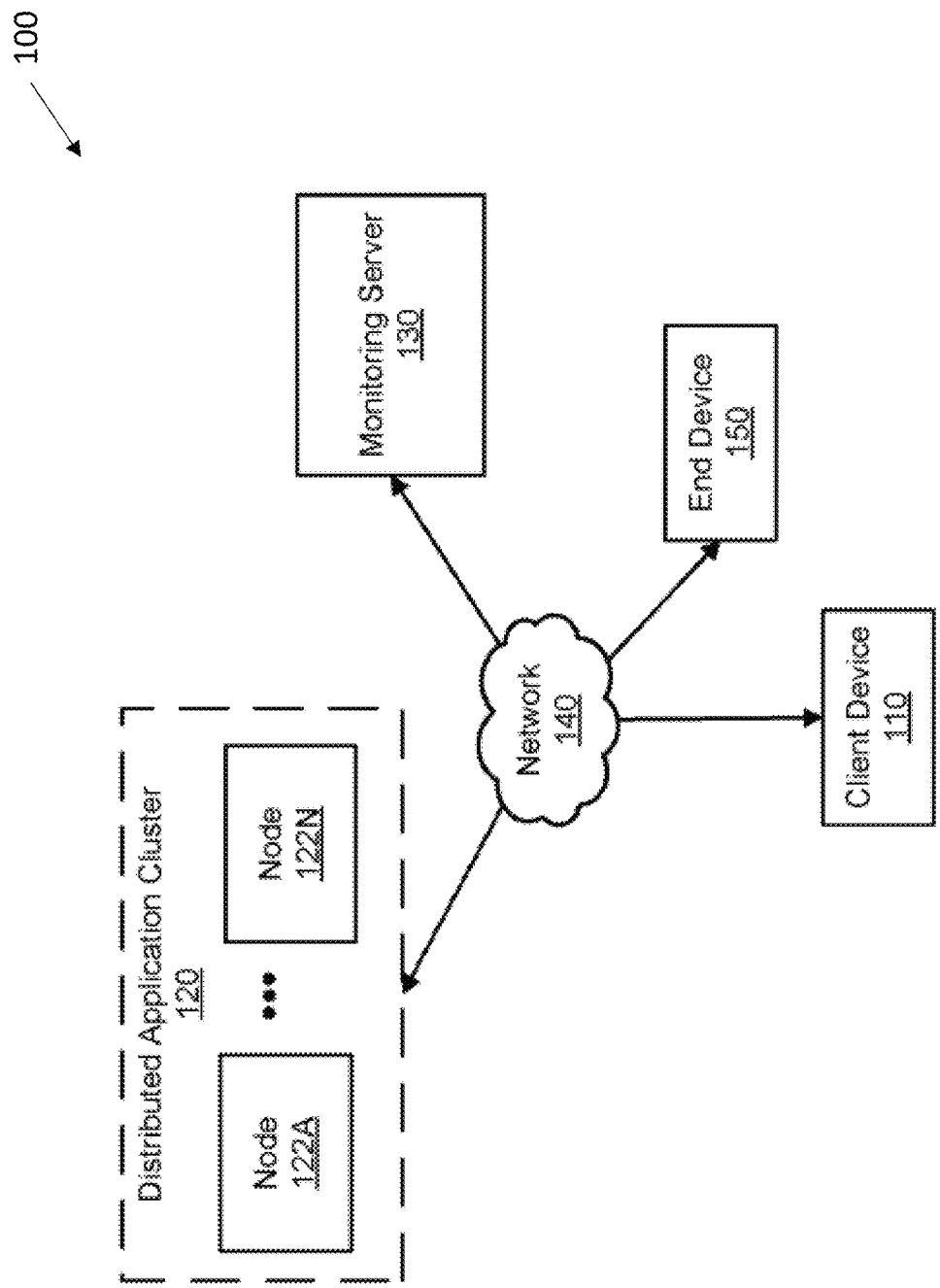
FIG. 1 is a block diagram of a system for providing and monitoring a distributed application cluster.

FIG. 1 is a block diagram illustrating a system 100 for providing and monitoring a distributed application cluster 120. The system 100 includes a client device 110, the distributed application cluster 120, a monitoring server 130, and an end device 150 connected by a network 140. The distributed application cluster 120 is a cluster of nodes 122 each running one or more pods. Each pod includes one or more containers running microservices that collectively provide a distributed application. In some examples, the pods may be containers, or virtual machines. In certain examples, one or more pods may not include any containers (e.g., upon initialization before containers are added). As part of running microservices that collectively provide the distributed application, containers may additionally run services such as databases or internal container orchestration platform services. The cluster of nodes 122 is managed by a container orchestration platform, such as KUBERNETES. The container orchestration platform operates upon the distributed application cluster 120, and may additionally operate at the monitoring server 130 and/or client device 110 depending upon the embodiment.

The client device 110 may be a personal computer, laptop, mobile device, or other computing device that includes a visual interface (e.g., a display). The client device 110 displays, at the visual interface, one or more user interfaces visualizing the structure, health, and/or performance of the distributed application cluster 120. In some embodiments, the client device 110 accesses the distributed application cluster 120 over the network 140 and can manage the distributed application cluster 120. For example, the client device 110 may be used to send instructions to the distributed application cluster 120 to control operation and/or configuration of the distributed application cluster 120.

The end device 150 accesses and uses the distributed application hosted at the distributed application cluster 120 via the network 140. For example, the end device 150 sends a request for data to the distributed application cluster 120, which forwards the request to a pertinent node 122 (e.g., one of nodes 122A to 122N), where a containerized microservice processes the request and then sends the requested data to the end device 150. The pertinent node 122 is a node 122 with a pod running an instance of the containerized microservice requisite for responding to the data request, and may be selected from multiple nodes running instances of the containerized microservice using a selection process, such as a round robin algorithm, or by ranking the multiple nodes by resource use (e.g., processor, memory, non-transitory storage) and selecting the least-used node. In an embodiment, some or all of the functionality of the end device 150 may also or instead be performed at the client device 110, and the system 100 may not include an end device 150.

The monitoring server 130 retrieves data from the distributed application cluster 120 and generates the one or more user interfaces, which the monitoring server 130 sends to the client device 110 for display. The generated one or more user interfaces include graphical elements representative of the structure and health of the distributed application cluster 120. Depending upon the embodiment, some or all of the monitoring server 130 functionality may instead be performed at the client device 110, and the system 100 may not include the monitoring server 130.

In some embodiments, the system 100 includes more than one client device 110, distributed application cluster 120, monitoring server 130, and/or end device 150. For example, the monitoring server 130 may itself be a distributed application cluster that provides monitoring server 130 functionality as the distributed application. Alternatively or additionally, in some embodiments, the monitoring server 130 can access and/or send instructions to the distributed application cluster 120.

The client device 110, nodes 122, monitoring server 130, and end device 150 are configured to communicate via the network 140, which may comprise any combination of local area and/or wide area networks, using both wired and/or wireless communication systems. In one embodiment, the network 140 uses standard communications technologies and/or protocols. For example, the network 140 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 140 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 140 may be represented using any suitable format, such as hypertext markup language (HTML) or extensible markup language (XML). In some embodiments, all or some of the communication links of the network 140 may be encrypted using any suitable technique or techniques.

Figure 2:
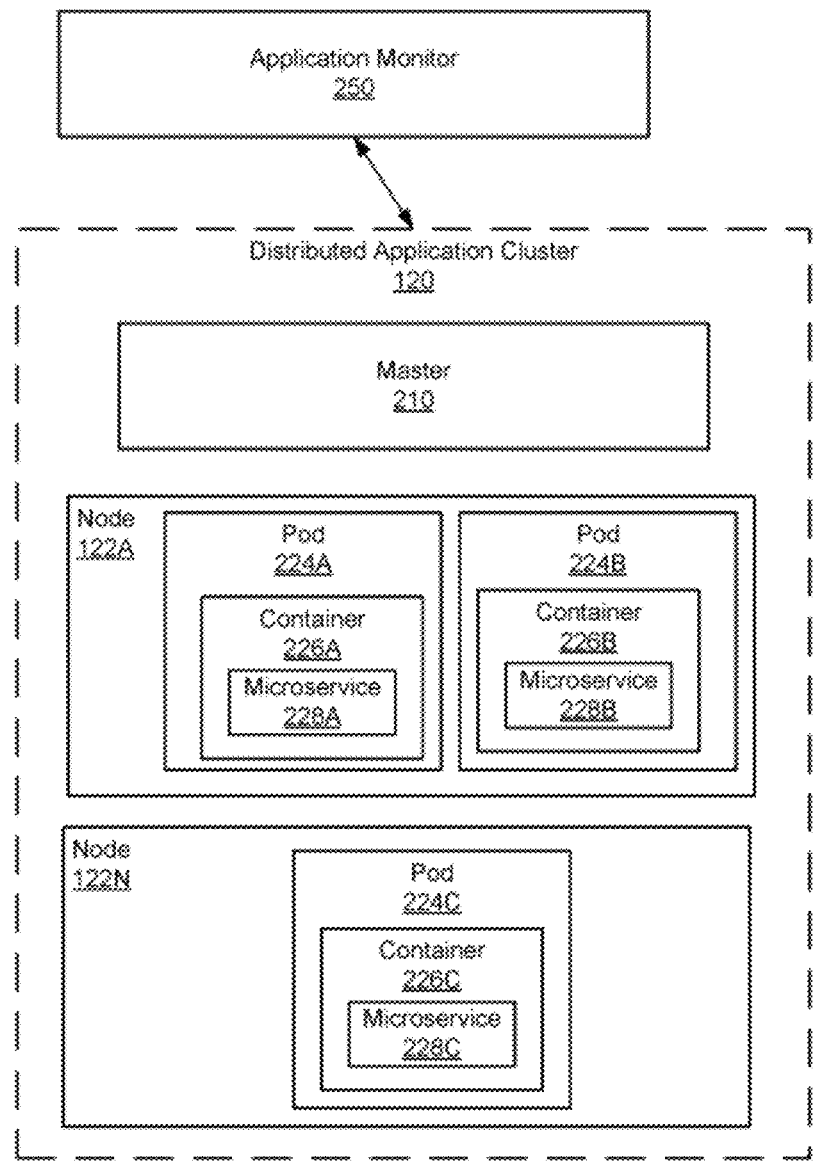
FIG. 2 is a functional block diagram of a distributed application cluster.

FIG. 2 is a block diagram illustrating an example of the distributed application cluster 120. The distributed application cluster 120 includes a master 210 and two nodes 122, and is connected to an application monitor 250. In some embodiments the application monitor 250 is not part of the distributed application cluster 120, and instead is at the monitoring server 130, where it receives data from the distributed application cluster 120, e.g., from the master 210.

Node 122A includes two pods 224A,B and node 122N includes pod 224C. Each pod 224 includes a container 226 with a microservice 228. Depending upon the embodiment, the distributed application cluster 120 can include fewer or more than two nodes 122, and each node 122 may include one, two, or more than two pods 224. In some embodiments, some nodes 122 include no pods 224, e.g., nodes 122 that have recently been added to the distributed application cluster 120, to which pods are to be added by the container orchestration platform. Pods that have yet to be added to a node 122 by the container orchestration platform are "unassigned" or "pending" pods.

Multiple of the microservices 228 may be different copies of the same microservice 228, although in some embodiments all the microservices 228 may be different. For example, in one embodiment, microservice 228A and microservice 228C are different instantiations of a first microservice that provides first functionality, while microservice 228B is a second microservice that provides second functionality. Together, the microservices 228 provide a distributed application. For example, microservice 228A could be a function to query a database, microservice 228B could be a function to add or remove data in the database, and microservice 228C could be a function to generate graphs based on retrieved database data, cumulatively providing a database interface application.

The master 210 is a component of the container orchestration platform that manages the distributed application cluster 120. It monitors microservice 228 usage and adds and removes pods 224 to the nodes 122 in response to the usage. The master 210 also monitors the nodes 122, and reacts to downed (e.g., broken) nodes. For example, node 122N loses its network connection, then the master 210 instructs node 122A to add an instance of pod 224C, thereby restoring the functionality lost when node 122N went offline. The master 210 may add or remove nodes 122 based on node usage, e.g., how much of each node's 122 processing units, memory, and persistent storage is in use.

The application monitor 250 monitors the distributed application cluster 120, collecting cluster data for the distributed application cluster 120. For example, the application monitor 250 tracks the distributed application cluster's nodes 122, the usage of each node 122 (e.g., in terms of processor use, memory use, and persistent storage use), which pods 224 are on each node, the usage of each pod 224 (e.g., in terms of microservice use), which if any pods are unassigned, and so on. Depending upon the embodiment, the application monitor 250 may reside upon the distributed application cluster 210 as in the figure, and/or upon the monitoring server 130 and/or client device 110.

Systems and methods for providing automation solutions for event logging and debugging on container orchestration platforms are provided herein. In at least one embodiment, the automated solutions include event logging and debugging on the KUBERNETES platform. In some examples, the solutions include no-instrumentation telemetry, an edge intel platform, entity linking and navigation, command driven navigation, and a hybrid-cloud/customer architecture.

No-Instrumentation Telemetry

In many cases, it is beneficial for developers or other users to monitor the functionality or performance of distributed applications. For example, gaining visibility into HTTP traffic can be valuable when working with distributed applications. This data can be used for performance, functional and security monitoring. Many applications accomplish this by utilizing middleware to add tracing or logging to requests (e.g., HTTP requests) in the application. In some cases, open source frameworks (e.g., Open Telemetry) can be used to instrument requests and related context. However, these approaches can involve manually adding instrumentation telemetry code to the application. Such manual additions can be time consuming, include recompilations or redeployments of the application, and/or introduce errors in the application.

As such, systems and methods for providing no-instrumentation telemetry are provided herein. In at least one embodiment, Berkeley Packet Filter (BPF) technology is utilized to capture data associated with applications without having to manually add instrumentation.

Figure 3:
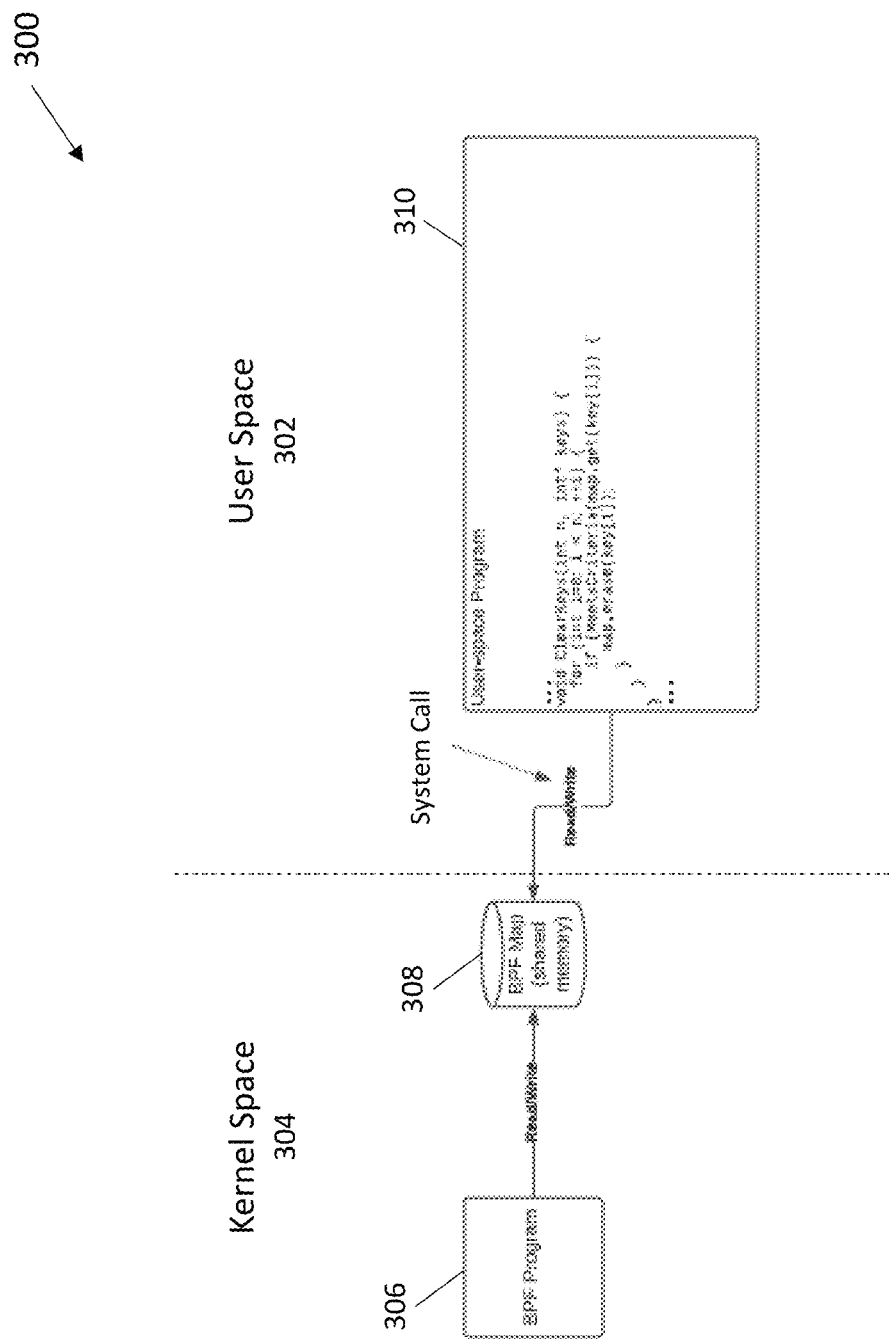
FIG. 3 is a functional block diagram of a computing environment.

FIG. 3 is a functional block diagram of an example computing environment 300. In one example, the computing environment 300 corresponds to an operating system, such as a Linux operating system. In some examples, the nodes 122 of the distributed application cluster 120 each correspond to the computing environment 300. As shown, the computing environment 300 includes a user space 302 and a kernel space 304. In some examples, the user space 302 is a set of memory locations where user processes are run (e.g., user programs, microservices, etc.) and the kernel space 304 is a set of memory locations where system processes are run (e.g., device drivers, memory management, etc.). The user space 302 and the kernel space 304 are separated to protect the kernel (i.e., system core) from any malicious or errant software behavior that may occur in the user space 302.

However, while the user space 302 is separated from the kernel space 304 to protect the kernel, in some cases, it may be necessary for the user (or user program) to have access to the kernel. For example, access to the kernel space 304 may be necessary to analyze network traffic or for other performance monitoring applications.

Berkeley Packet Filter (BPF) technology or Extended Berkeley Packet Filter (eBPF) technology can be used to provide "safe" access for users (or microservices) to the kernel space 304. As shown in FIG. 3, the kernel space 304 includes a BPF program 306. In one example, the BPF program 306 is a user developed program (or module) configured to perform one or more functions within the kernel space 304. As described above, the BPF program 306 can be configured to provide one or more functions associated with performance monitoring (e.g., network traffic analysis). The BPF program 306 may be developed in a user-friendly programming language before being compiled into machine language and deployed in the kernel space 304. In some examples, the Linux BPF architecture includes a BPF verifier configured to ensure the BPF program 306 is incapable of malicious or errant software behavior within the kernel space 304.

In Linux BPF architectures, BPF maps are used as global shared memory structures that can be accessed from the user space 302 and the kernel space 304. In some examples, the BPF map 308 is used to transfer data between the user space 302 and the kernel space 304. As shown in FIG. 3, the computing environment 300 includes a BPF map 308. The BPF map 308 can be accessed within the kernel space 304 by the BPF program 306.

In one example, the BPF map 308 can be accessed from the user space 302 via system calls that are native to the computing environment 300. For example, Linux operating systems include system calls that provide different BPF map operations (e.g., read, write, clear, etc.). In some examples, the native system calls may function similarly to an application programming interface (API) between the user space 302 and the BPF map 308. A user program 310 may be developed by the user and configured to call one or more of the BPF system calls from the user space 302.

The Linux BPF architecture supports the use of BPF probes configured to interrupt the user space 302 in favor of BPF programs within the kernel space 304. In some examples, the BPF probes can be configured to trigger based on various events (e.g., user functions, timers, kernel processes, etc.).

No-Instrumentation Protocol Tracing

Figure 4A:
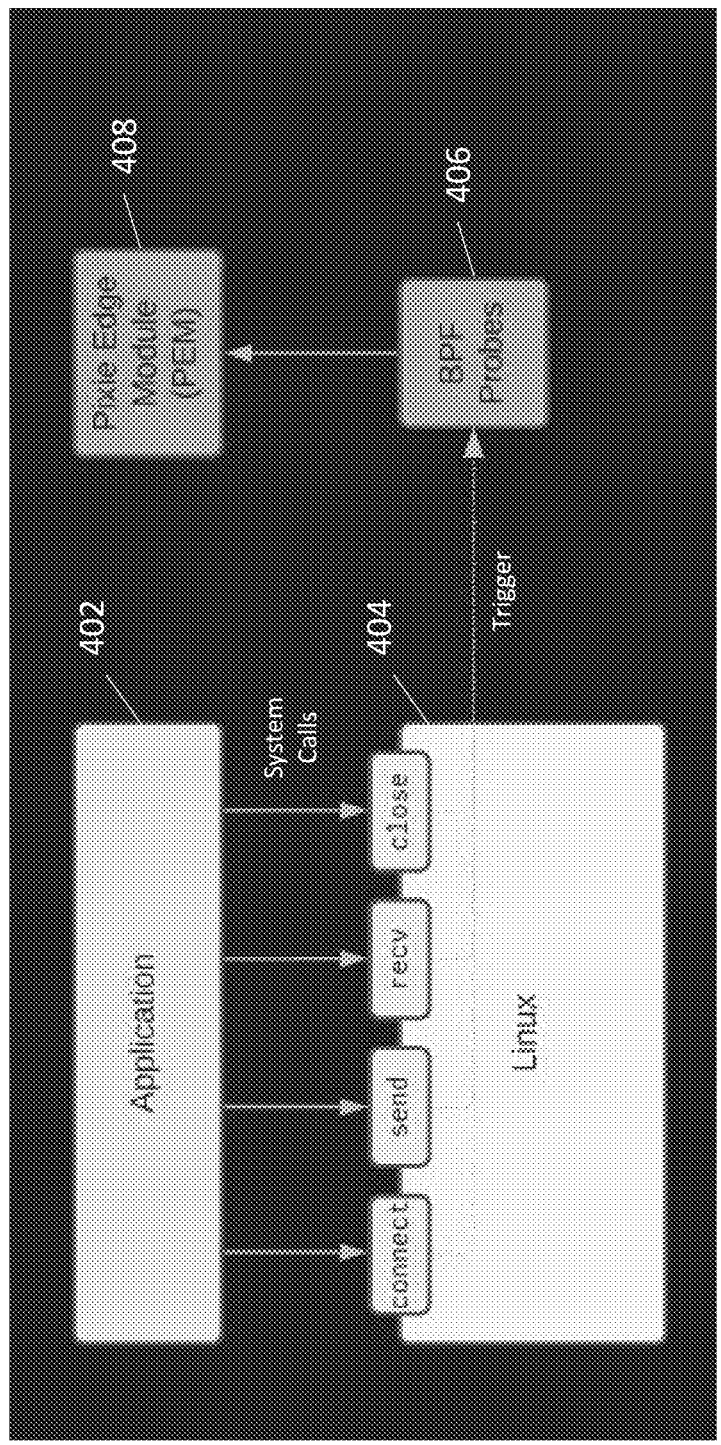
FIG. 4A is a functional block diagram of a protocol tracing architecture in accordance with aspects described herein.

FIG. 4A is a functional block diagram of a protocol tracing architecture 400 in accordance with aspects described herein. In one example, the protocol tracing architecture 400 includes the use of kernel BPF probes ("kprobes") to trace Linux system calls ("syscalls"). By tracing the Linux system calls, send and receive messages (or requests) can be traced to infer the protocol in use.

As shown, the protocol tracing architecture 400 includes a user application 402, a Linux environment 404, a plurality of BPF probes 406, and an edge module 408. In one example, the user application 402 corresponds to one of the microservices 228 of FIG. 2 (e.g., microservice 228A) and the Linux environment 404 corresponds to the computing environment running on one of the nodes 122 of FIG. 2 (e.g., node 122A). The edge module 408 is configured to run on the node 122A with the application 402. The configuration of the edge module 408 may be determined and/or adjusted by a user (e.g., via the client device 110). The edge module 408 can be instantiated on the node 122A without disrupting the other applications running on the node 122A.

Figure 4B:
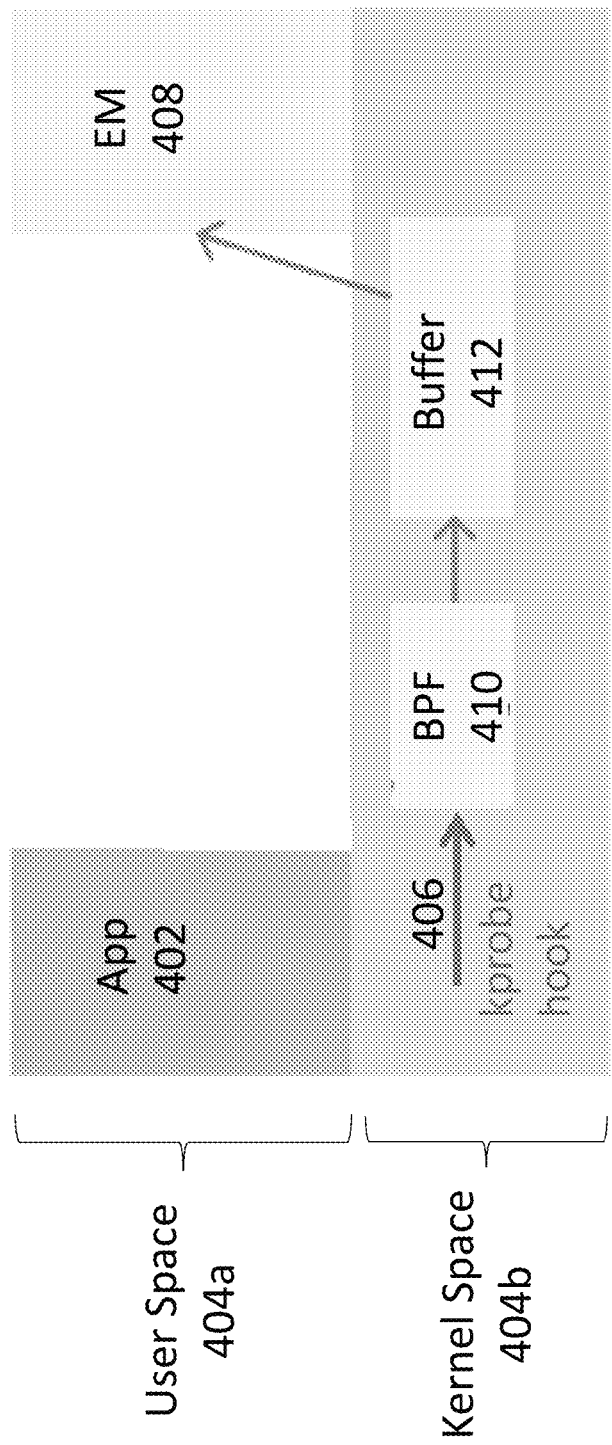
FIG. 4B is another block diagram of the protocol tracing architecture of FIG. 4A.

As shown in FIG. 4B, at least a portion of the edge module 408 is configured to operate in a user space 404a of the Linux environment 404. The edge module 408 is configured to communicate (e.g., receive data) from at least one BPF program 410 operating in a kernel space 404b of the Linux environment 404. In some examples, the at least one BPF program 410 is included in the edge module 408 (e.g., as a kernel space portion of the edge module 408).

The edge module 408 is configured to deploy the plurality of BPF probes 406 to trace data sent between the user application 402 and the kernel space 404b of the Linux environment 404. In one example, the plurality of BPF probes 406 include kprobes configured to trigger based on the occurrence of certain kernel functions (e.g., received syscalls). In some examples, the plurality of BPF probes 406 are configured to trigger on specific system calls based on the configuration (e.g., user configuration) of the edge module 408. In certain examples, the designated system calls may include system calls used for networking. For example, the BPF probes 406 may be registered to trigger on "connect," "send," "recv," and "close" system calls sent from the user application 402 to the kernel space 404b of the Linux environment 404.

The BPF probes 406 can trigger the BPF program 410 to capture raw message data. In one example, the BPF program 410 is configured to analyze the raw message data to determine the protocol associated with the data. If the protocol is of interest, the raw message data is transferred by the BPF program 410 to the user space 404a of the Linux environment 404. In one example, the BPF program 410 is configured to transfer the raw message data to the edge module 408 via a buffer 412 (e.g., a perf buffer). The raw message data is subsequently parsed by a protocol parser into well-formed/structured data, which is pushed and stored into data tables for querying. In one example, the protocol parser is included in the edge module 408.

In other examples, the protocol inference can occur outside of the BPF program 410 (e.g., in the user space 404a). In such examples, the protocol inference can be moved into the user space 404a by sending full or sample data for each protocol connection to the edge module 408. If a connection is inferred not to be a protocol of interest, the edge module 408 can send a command (or signal) back to the BPF program 410 to discontinue tracing the connection. The protocol tracing architecture 400 may be used with HTTP, MySQL, PostgreSQL, CQL and DNS protocols, or other types of data protocols.

While the example above describes capturing data from one user application 402, it should be appreciated that the user application 402 may correspond to multiple applications running on the same node (e.g., microservices 228A, 228B of FIG. 2). As such, the edge module 408 can be configured to trace protocols across multiple applications simultaneously. Likewise, while the above describes protocol tracing over unencrypted channels, the protocol tracing architecture 400 can be adapted for protocol tracing over encrypted channels.

Figure 5A:
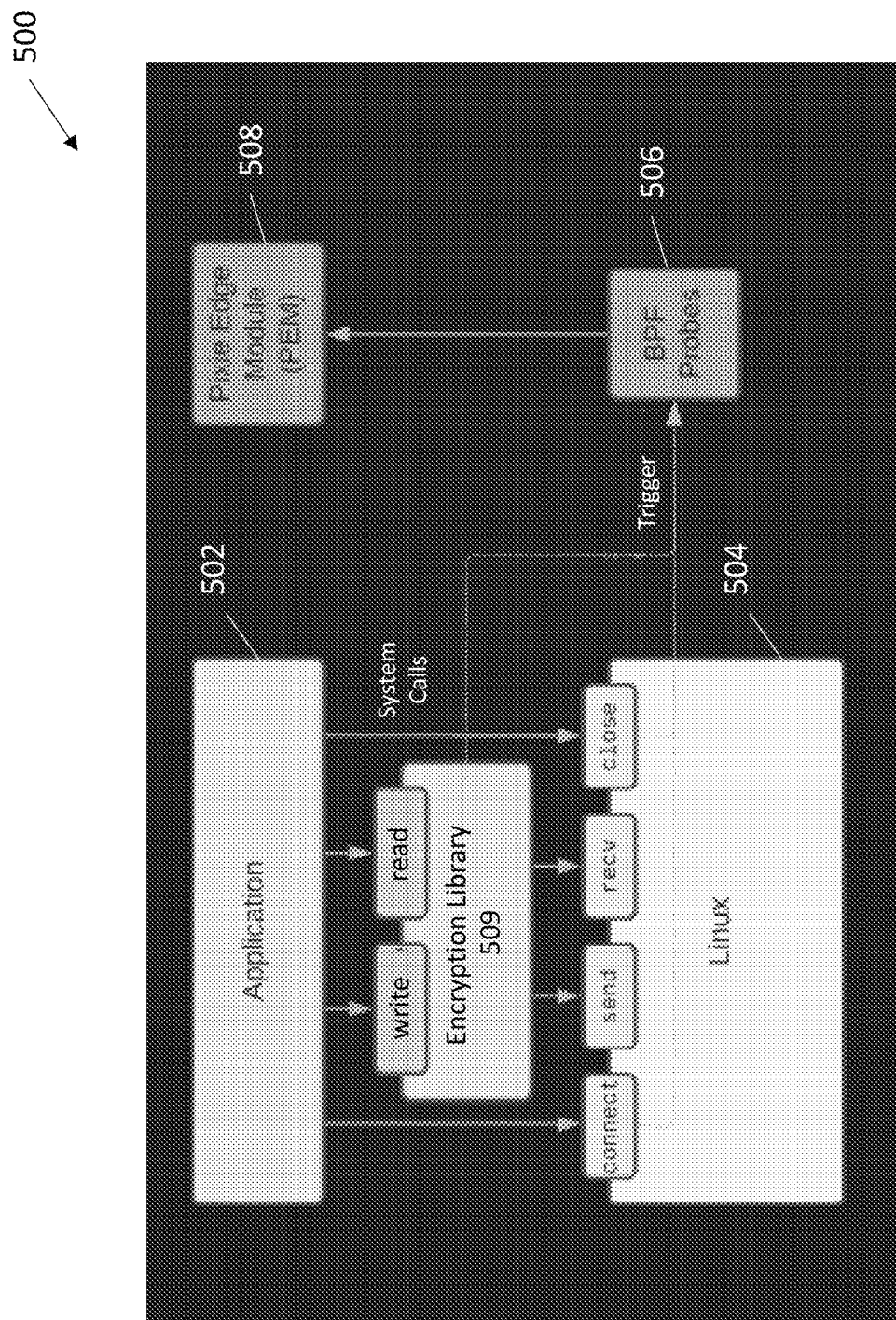
FIG. 5A is a functional block diagram of a protocol tracing architecture in accordance with aspects described herein.

FIG. 5A is a functional block diagram of a protocol tracing architecture 500 in accordance with aspects described herein. In one example, the protocol tracing architecture 500 includes the use of user BPF probes ("uprobes") and kernel BPF probes ("kprobes") to trace Linux system calls. By tracing the Linux system calls, send and receive messages (or requests) can be traced to infer the protocol in use over encrypted channels.

The protocol tracing architecture 500 is substantially similar to the protocol tracing architecture 400 of FIG. 4A, except the protocol tracing architecture 500 includes an encryption library 509. The edge module 508 is configured to deploy a plurality of BPF probes 506 to trace data sent between the user application 502, the kernel space 504b of the Linux environment 504, and the encryption library 509. In some examples, the encryption library 509 corresponds to the OpenSSL library, the GoTLS library, and/or other encryption libraries.

The plurality of BPF probes 506 includes uprobes configured to trigger based on the occurrence of certain activity between the user application 502 and the encryption library 509. In some examples, the uprobes are configured to trigger on functions of the application 502 based on a configuration (e.g., user configuration) of the edge module 508. The designated functions may include writing data to the encryption library 509 and reading data from the encryption library 509. In addition, the plurality of BPF probes 506 includes kprobes configured to trigger based on the occurrence of certain kernel functions (e.g., received syscalls). In some examples, the plurality of BPF probes 506 are configured to trigger on specific system calls based on the configuration of the edge module 508.

Figure 5B:
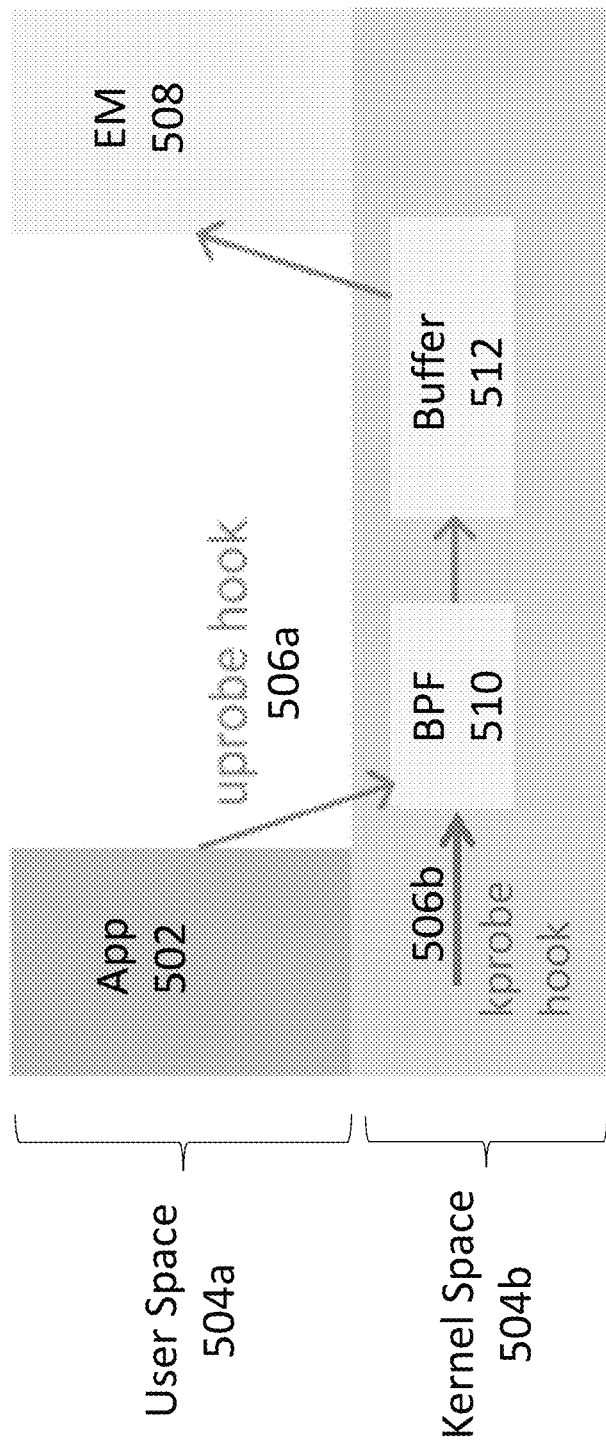
FIG. 5B is another block diagram of the protocol tracing architecture of FIG. 5A.

By capturing data at the encryption library 509, the BPF probes 506 can be used to trace data higher up (i.e., upstream) in the application stack prior to being encrypted. As shown in FIG. 5B, the BPF probes 506 can trigger the BPF program 510 to capture raw message data. The BPF program 510 can be triggered by one or more uprobes 506a to capture data at the encryption library 509. Likewise, the BPF program 510 can be triggered by one or more kprobes 506b to capture data associated with kernel functions (e.g., syscalls). In one example, the BPF program 510 is configured to analyze the raw message data to determine the protocol associated with the data. If the protocol is of interest, the raw message data is transferred by the BPF program 510 to the user space 504a of the Linux environment 504. In one example, the BPF program 510 is configured to transfer the raw message data to the edge module 508 via the buffer 512. The raw message data is subsequently parsed by a protocol parser into well-formed/structured data, which is pushed and stored into data tables for querying. In one example, the protocol parser is included in the edge module 508.

In other examples, the protocol inference can occur outside of the BPF program 510 (e.g., in the user space 504a). In such examples, the protocol inference can be moved into the user space 504a by sending full or sample data for each protocol connection (e.g., at the encryption library 509) to the edge module 508 (e.g., via the buffer 512). If a connection is inferred not to be a protocol of interest, the edge module 508 can send a command (or signal) back to the BPF program 510 to discontinue tracing the connection. In some examples, the protocol tracing architecture 500 allows data tracing for protocols such as HTTPS or other protocols operating over encrypted channels (e.g., SSL/TLS).

Certain protocols may require a state for interpretation. For example, the HTTP2 protocol uses a compression scheme to encrypt headers. As such, decoding captured messages is not possible without knowing the compression state. In some examples, uprobes included in the plurality of BPF probes 506 can be used to directly trace the HTTP2 library (e.g., encryption library 509) and capture the messages before the compression is applied. In certain examples, the uprobes can be used to trace multiple, different HTTP2 libraries. In other examples, the uprobes can be used to trace multiple, different Golang HTTP2 libraries.

FIG. 6 is a flow diagram of a protocol tracing method 600 in accordance with aspects described herein. In one example, the method 600 corresponds to the operation of protocol tracing architectures 400, 500 of FIGS. 4A-5B.

At block 602, an edge module is provided and configured to deploy a BPF probe (e.g., kprobe) and a corresponding BPF program in the computing environment. In one example, the edge module is configured to run on the computing environment with a distributed application (e.g., application 402 or 502). In some examples, the computing environment corresponds to a node of the distributed application cluster.

At block 604, the BPF probe is triggered based on an event associated with the distributed application running in a user space of the computing environment. In one example, the event (or events) that trigger the BPF probe are identified in a configuration of the edge module (e.g., a user configuration, system configuration, etc.). The events may correspond to "syscalls" that are sent from the user space to the kernel space. In some examples, the events are selected by a user for monitoring or debugging purposes. In other examples, the events may be automatically selected to provide monitoring and/or event logging that is representative of the distributed application.

At block 606, data associated with the event is captured (or collected) in a kernel space of the computing environment via the BPF program.

At block 608, the captured data is analyzed via the BPF program to an infer a protocol associated with the captured data. A determination is made as to whether the inferred protocol is a protocol of interest. In one example, the protocol(s) of interest are identified in the edge module configuration.

At block 610, in response to a determination that the inferred protocol is a protocol of interest, the captured data is transferred from the kernel space of the computing environment to the user space of the computing environment. In one example, the captured data is transferred from the BPF program to the edge module. Otherwise, in response to a determination that the inferred protocol is not a protocol of interest, the BPF probe can be reset and the method 600 returns to block 604. In certain examples, the tracing may be discontinued in response to a determination that the protocol is not of interest.

Dynamic Logging of Application Binaries

In addition to protocol tracing, it may be desirable to leverage BPF technology to provide dynamic logging of application binaries. For example, user BPF probes can be used to trace or log events associated with distributed applications. Such tracing or logging can be used by developers (or other users) to determine the root causes of functional and/or performance issues.

In one example, an end-to-end system enables a user to dynamically inject a trace point on an actively running application using a high-level specification. In some examples, the dynamic injection of trace points can be achieved by (i) taking the high-level specification to automatically generate the BPF uprobe code (e.g., configuration code) to collect the desired information (e.g., trace latency, the inputs and outputs to a function every time it is called, etc.), and (ii) deploying the uprobes. In certain examples, the generation of the BPF uprobe code includes the use of (or reference to) a BPF Compiler Collection (BCC) toolkit.

In one example, the automatic generation of BPF uprobe code includes the use of debug symbols to locate the variables of interest in memory. The variables of interest can be subsequently extracted and exported. The aforementioned approach may be used to generate code that would otherwise be a time consuming, tedious, and error-prone process. The captured data can be subsequently outputted into a structured format (e.g., into data tables) for easy querying. This can provide visibility to desired application functions without the need to recompile and/or redeploy the application.

In some examples, basic types and/or complex structs can be traced using the generated BPF uprobes. In the case of complex structs, debug symbols can be utilized to trace all the members of the struct from memory as raw bytes, and then cast them back into the defined structure in user space after copying them from kernel space. In some embodiments, Golang interfaces can be traced by detecting the run-time type against a set of potential interface candidates extracted from the compiled code. Subsequently, the run-time type is checked against a list in the kernel space (e.g., in a BPF map). Further, raw bytes are sent for the type of interest to the user space with an indicator of the type so that it can be decoded in the user space.

Figure 7A:
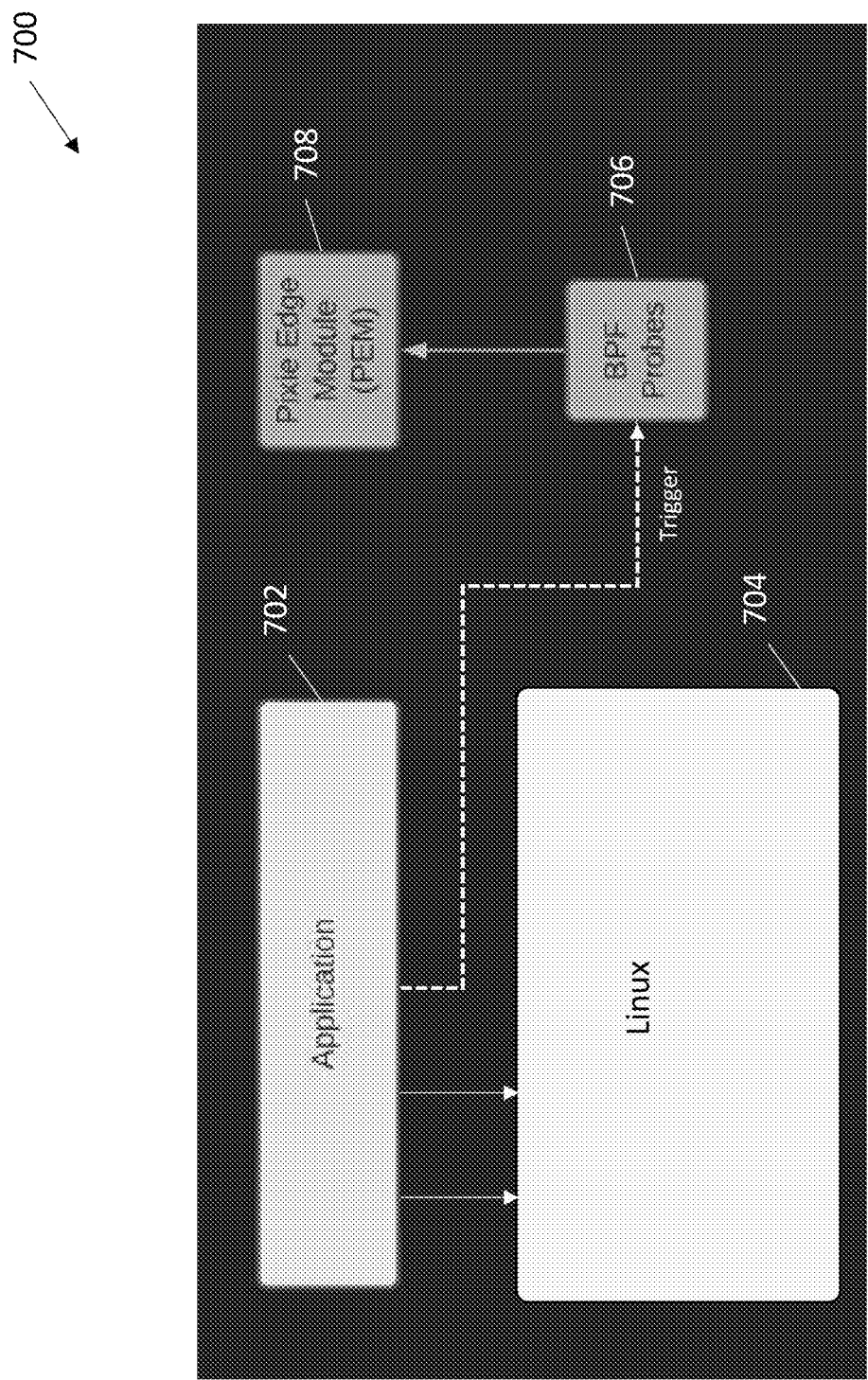
FIG. 7A is a functional block diagram of a function tracing architecture in accordance with aspects described herein.

FIG. 7A is a functional block diagram of a function tracing architecture 700 in accordance with aspects described herein. In one example, the function tracing architecture 700 includes the use of user BPF probes ("uprobes") to capture desired information from one or more application functions (e.g., trace latency, the inputs and outputs to a function every time it is called, etc.). The function tracing architecture 700 includes an application 702, a Linux environment 704, a plurality of BPF probes 706, and an edge module 708.

As described above, the user (e.g., developer) may use an end-to-end system to generate BPF probes 706 and inject trace points in functions of the application 702. In one example, the end-to-end system corresponds, at least in part, to the system 100 of FIG. 1. For example, the user may use the client device 110 to specify functions and variables included in the deployed application 702 for inspection. The memory addresses of the specified functions are used to link (or register) the functions to the BPF probes 706. For example, the memory addresses of the specified functions can be included in the configuration code generated for the plurality of BPF probes 706. In some examples, the BPF probes 706 are triggered whenever the memory addresses of the functions are reached.

Figure 7B:
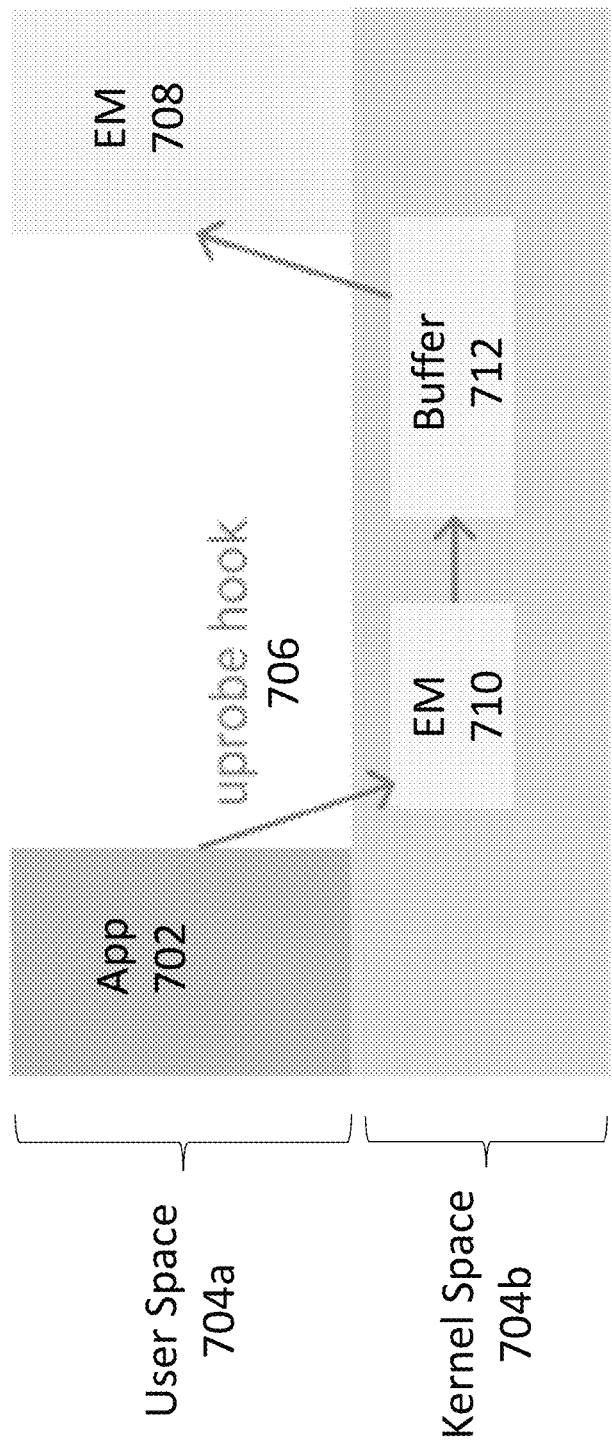
FIG. 7B is another block diagram of the function tracing architecture of FIG. 7A.

As shown in FIG. 7B, the BPF probes 706 can trigger the BPF program 710 to capture raw data. The BPF program 710 can be triggered by a uprobe 706 to capture the desired data. For example, data associated with specified variables may be captured by the BPF program 710. The raw data is transferred by the BPF program 710 to the user space 704a of the Linux environment 704. In one example, the BPF program 710 is configured to transfer the raw message data to the edge module 708 via the buffer 712. The raw data may be parsed, sorted, and/or processed into well-formed/structured data, which is pushed and stored into data tables for querying.

While the example above describes capturing data from one application 702, it should be appreciated that the application 702 may correspond to multiple applications (e.g., microservices 228A, 228B of FIG. 2). As such, the edge module 708 can be configured to trace data across functions included in multiple applications simultaneously.

Figure 8:
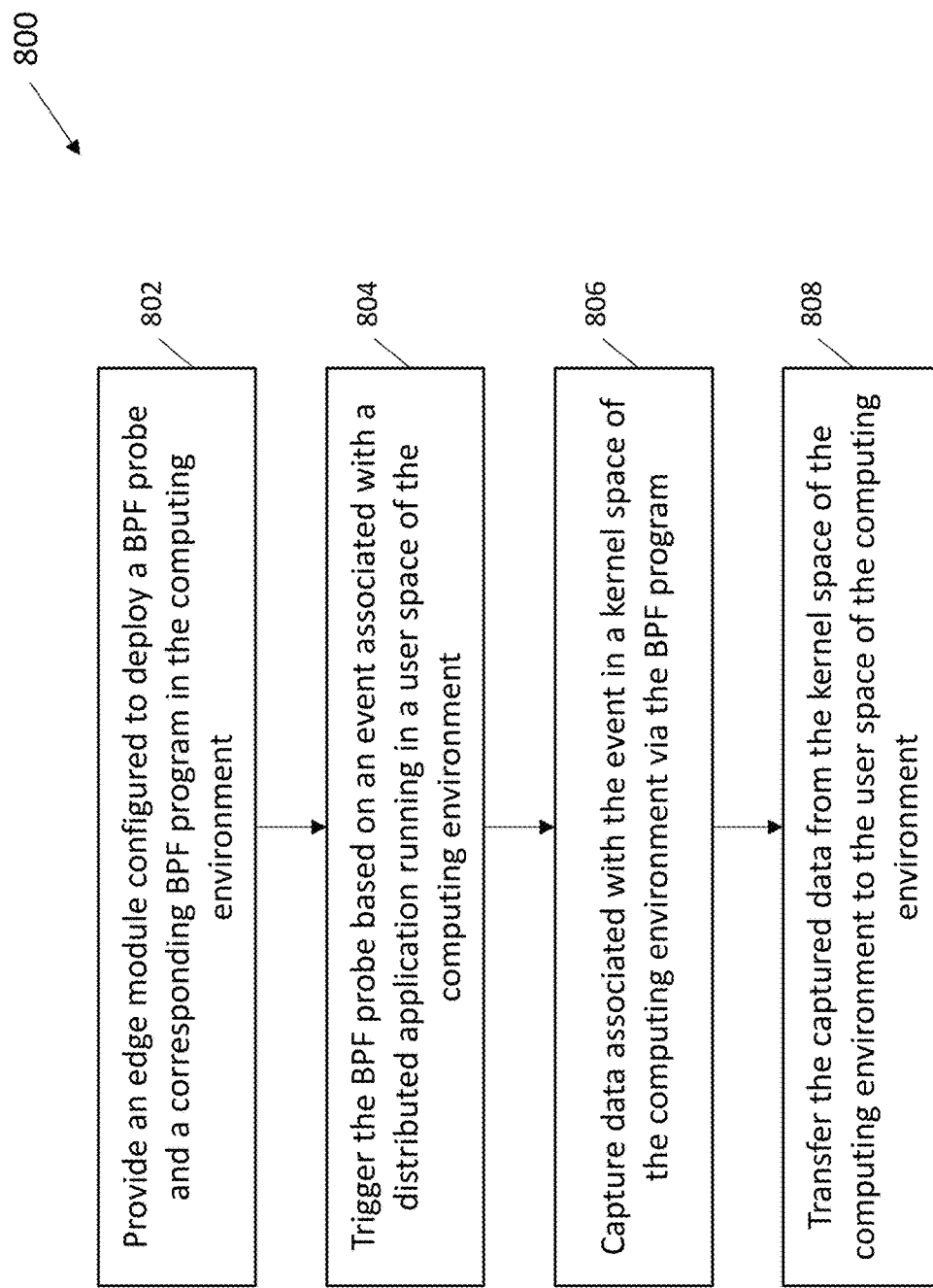
FIG. 8 is a flow diagram of a function tracing method in accordance with aspects described herein.

FIG. 8 is a flow diagram of a function tracing method 800 in accordance with aspects described herein. In one example, the method 800 corresponds to the operation of function tracing architecture 700 of FIGS. 7A,7B.

At block 802, an edge module is provided and configured to deploy a BPF probe (e.g., uprobe) and a corresponding BPF program in the computing environment. In one example, the edge module is configured to run on the computing environment with a distributed application (e.g., application 702). In some examples, the computing environment corresponds to a node of the distributed application cluster.

At block 804, the BPF probe is triggered based on an event associated with the distributed application running in a user space of the computing environment. In one example, the event (or events) that trigger the BPF probe are identified in a configuration of the edge module (e.g., a user configuration, system configuration, etc.). In some examples, the events correspond to specific functions of the application 702 that are selected by a user for monitoring or debugging purposes. In other examples, the events correspond to functions that are automatically selected to provide monitoring and/or event logging that is representative of the distributed application.

At block 806, data associated with the event is captured (or collected) in a kernel space of the computing environment via the BPF program.

At block 808, the captured data is transferred from the kernel space of the computing environment to the user space of the computing environment. In one example, the captured data is transferred from the BPF program to the edge module.

Dynamic Deployment of BPF Programs

As described above, BPF probes can be automatically deployed and registered to corresponding BPF programs (e.g., BPF program 410) to provide no-instrumentation telemetry. In some examples, such BPF programs may be developed using BPF specific languages and toolkits. For example, BPFTrace is a high-level tracing language for Linux eBPF that can be used to for BPF program development. However, it can be challenging to deploy and monitor BPFTrace scripts across an entire cluster (e.g., cluster 120).

As such, a distributed BPF code management system can be used to automatically deploy BPFTrace scripts across the cluster 120. In one example, distributed BPF code management system includes a specification (e.g., in the PxL language) that provides the automatic deployment of BPFTrace scripts. In some examples, the code (i.e., BPFTrace script) is analyzed to detect outputs such that the collection of the data from the BPF program can be automated (e.g., via edge module 408). The data from each deployed BPF program on the cluster can be formatted into a structured record for easy querying. In some examples, the distributed BPF code management can be applied to BCC, GoBPF and other BPF front-ends.

Flexible Architecture

Figure 9:
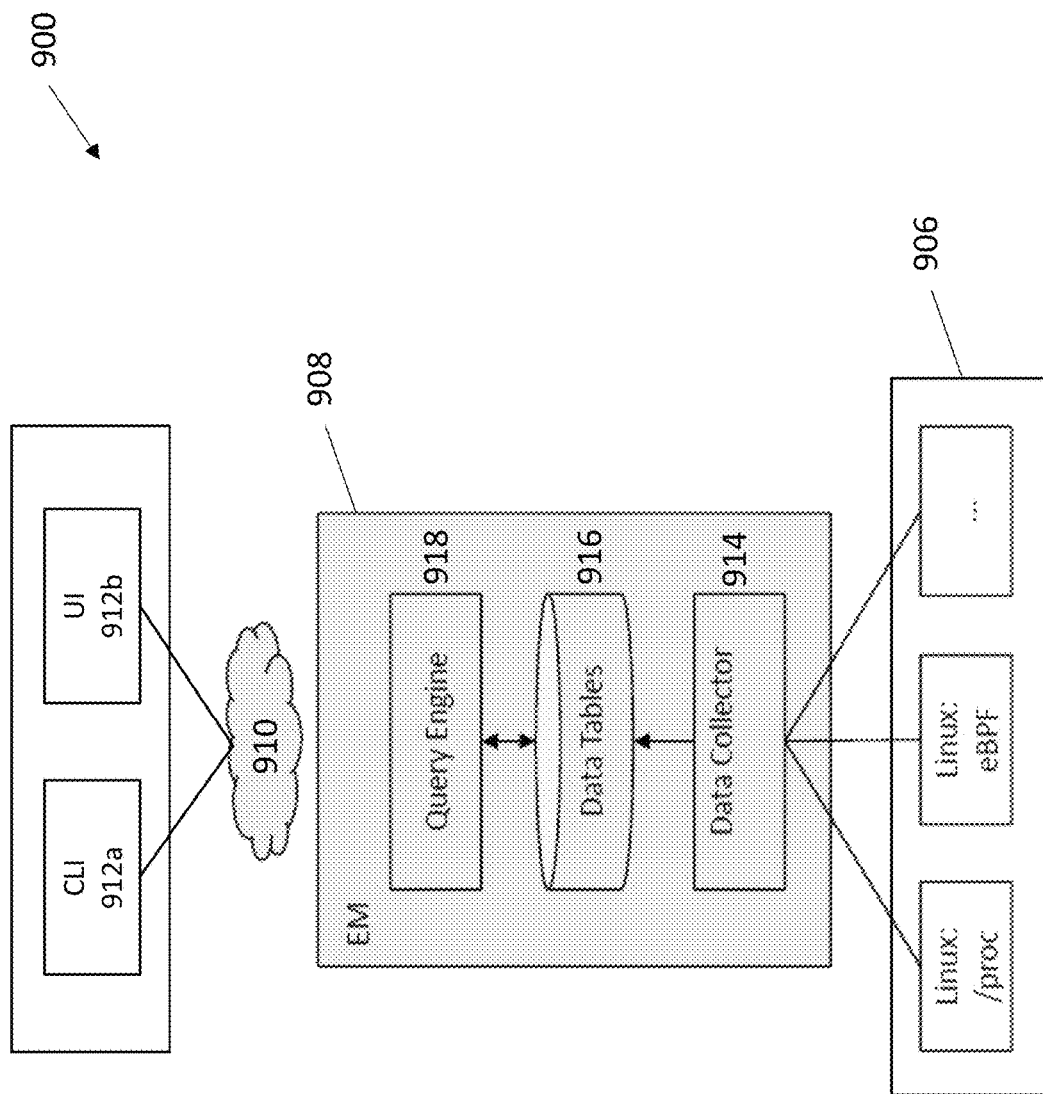
FIG. 9 is functional block diagram of a distributed application monitoring system in accordance with aspects described herein.

The edge module can be configured with a flexible architecture that accepts data from a plurality of sources. FIG. 9 illustrates a distributed application monitoring system 900 in accordance with aspects described herein. As shown, the system 900 includes a plurality of sources 906, an edge module 908, a distributed agent 910, and a plurality of interface tools 912. The edge module 908 may correspond to each of the edge modules 408, 508, and 708 of FIGS. 4A-5B and 7A-7B. The edge module 908 is configured to run on a node included in a distributed application cluster (e.g., cluster 120). In one example, the edge module 908 includes a data collector 914, a plurality of data tables 916, and a query engine 918. The distributed agent 910 provides an interface between the edge module 908 and the plurality of interface tools 912. In one example, the plurality of interface tools includes a command line interface (CLI) 912a and a user interface (UI) 912b.

The plurality of sources 906 can include Linux kernel data exports (e.g., CPU, IO, memory usage), eBPF data exports (e.g., outputs from BPF programs), Linux APIs, Java Virtual Machines (JVM), and other sources. In one example, the edge module 908 (or the data collector 914) includes an API that allows for the addition of new data sources in a flexible manner. The data collector 914 can parse, sort, and/or process the collected data into well-formed/structured data, which is pushed and stored into the plurality of data tables 916. The query engine 918 enables the plurality of data tables 916 to be searched. In some examples, developers (or other users) can use the interface tools 912 to engage with the query engine 918 via the distributed agent 910. In one example, the distributed agent 910 is configured to run on the distributed application cluster (e.g., cluster 120) and is responsible for query execution and managing each edge module 908.

Edge Intel Platform

As described above, a distributed agent (e.g., agent 910) can be executed on the distributed application cluster 120. In one example, the distributed agent 910 includes an "edgeML" system that uses the distributed data across all of the nodes 122 on the cluster 120 to train an unsupervised model used for clustering events. In some examples, the edgeML system is configured to train one or more machine learning (ML) or artificial intelligence (AI) models. Each edge device (i.e., node 122) has an independent inference execution engine running as part of the agent 910, and each edge device keeps track of its own "coreset," a small subset of the data of which is mathematically guaranteed to be a representative sample of the total data on the node 122. At query time, the coresets are merged together by a central node (e.g., node 122A), and the ML/AI model for data clustering is trained using the resulting unified coreset of events.

In one example, the data clustering includes automatically clustering events collected without knowledge or guidance about the nature of those events. For example, HTTP request data can be clustered by the edgeML system based on the semantic similarity of the requests to provide usable metrics. In some examples, a coreset algorithm is applied to achieve optimized, streamed semantic clustering of the coreset data. For example, a kmeans coreset algorithm can be applied for semantic clustering of HTTP request data. The application of the kmeans coreset algorithm can provide clustering on streaming data with only log N memory.

In some examples, a query language (e.g., PxL) can enable feature generation and inference using the edgeML system. Feature generation and inference can be invoked as a user-defined function, which allows integration of results directly in the data analysis, cleaning, and structuring phases.

Figure 10:
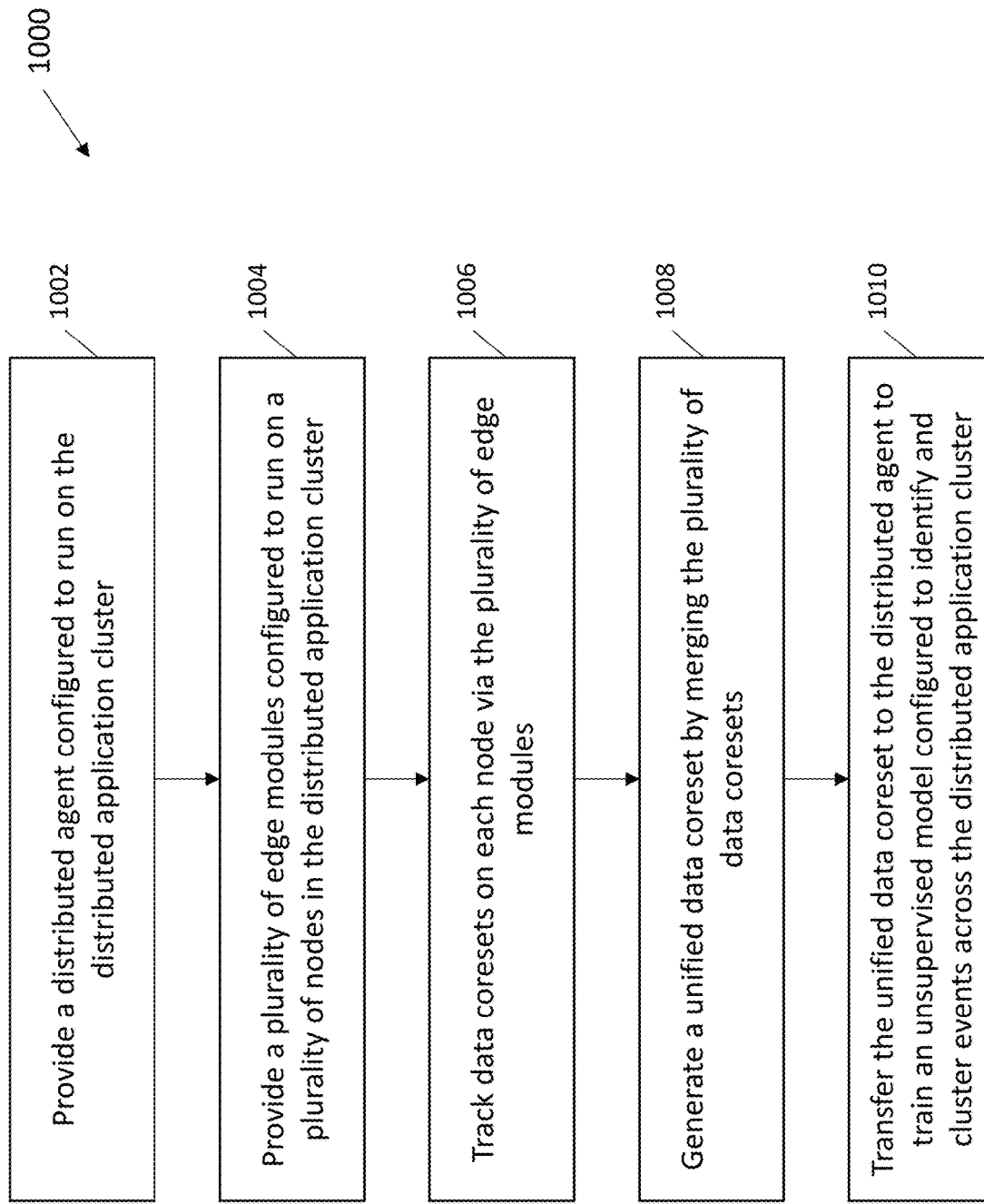
FIG. 10 is a flow diagram of a method for identifying and clustering events on a distributed application cluster in accordance with aspects described herein.

FIG. 10 is a flow diagram of a method 1000 for identifying and clustering events on a distributed application cluster in accordance with aspects described herein. In one example, the method 1000 can be carried out, at least in part, by the distributed application monitoring system 900 of FIG. 9.

At block 1002, a distributed agent (e.g., agent 910) is provided and configured to run on the distributed application cluster. In one example, the distributed application cluster includes a plurality of nodes and at least one distributed application runs on each node of the plurality of nodes.

At block 1004, a plurality of edge modules are provided. In one example, each edge module is configured to run on a corresponding node of the plurality of nodes. In some examples, each edge module is configured to deploy at least one BPF probe and at least one corresponding BPF program on the corresponding node.

At block 1006, a plurality of data coresets corresponding to each node of the plurality of nodes are tracked via the plurality of edge modules. In one example, each data coreset includes data associated with the distributed applications running on the corresponding node. The data included in each data coreset may be a representative sample of the corresponding node's total data. In some examples, each data coreset is tracked by triggering the at least one BPF probe and collecting data via the at least one corresponding BPF program associated with the edge module on each node.

At block 1008, a unified data coreset is generated by merging the plurality of data coresets. In one example, merging the plurality of data coresets includes transferring the plurality of data coresets to the edge module of a central node of the plurality of nodes. The central node may then transfer the unified data coreset to the distributed agent. In some examples, the unified data coreset is updated (or remerged) at periodic intervals. In other examples, the unified data coreset can be generated and/or updated in response to data queries received at the distributed agent (e.g., from the CLI 912a or the UI 912b).

At block 1010, the unified data coreset is transferred to the distributed agent to train an unsupervised model configured to identify and cluster events across the distributed application cluster. In one example, the unsupervised model is an ML and/or AI model.

Entity Linking & Navigation

In some examples, semantic types can be used to track contextual information about collected data over time. In one example, relevant entity semantic types (e.g., pod, microservice, etc.) are computed (or detected) and propagated with the data and associated data queries. As such, even after arbitrary transformations on the data, the semantic types can be correctly outputted in query results. In one example, these semantic types can be referenced via the CLI 912a and/or the UI 912b to provide contextual displays. For example, a value with a semantic type representing latency quantiles can be rendered as a box whisker plot and displayed to the user via the UI 912b.

In some examples, semantic types can be used to create contextual "deep links" to dedicated views for a given entity type in both the CLI 912a and the UI 912b. For example, a value annotated with the "Pod" semantic type will automatically be linked to a dedicated view for that specific pod. Such linking can be accomplished automatically without any input from the user. In some examples, the query engine 918 automatically propagates the semantic types used by a client to create the "deep link."

In some examples, URLs can be generated that are "entity-centric." Each entity may have a hierarchical URL that can be used to see its landing page or view. For example, the URL to navigate to the default view for a pod may be: "/cluster/:cluster_id/ns/:ns/pod/:pod_name." Each URL for an entity or set of entities can be backed by a live view that is the default for the entity type. Additional live views can be registered as sub-properties of such entities. For example, a non-default view called "pod_node_stats" could be written as:
"/cluster/:cluster_id/ns/:ns/pod/:pod_name?script=pod_node_stats." In some examples, user-defined scripts can be automatically translated into entity-centric URLs based on defined variables in the script. For example, reserved variable names such as "namespace," "pod_name," and "service_name" may automatically be translated. As such, a script that contains a "namespace" variable and a "pod_name" variable can be inferred to be about the pod in "pod_name." In some examples, the entity centric URLs exist within the confines of the CLI 912a (or the UI 912b). The UI 912b may be responsible for mapping the URLs to the views that should be loaded for the user.

Figure 11:
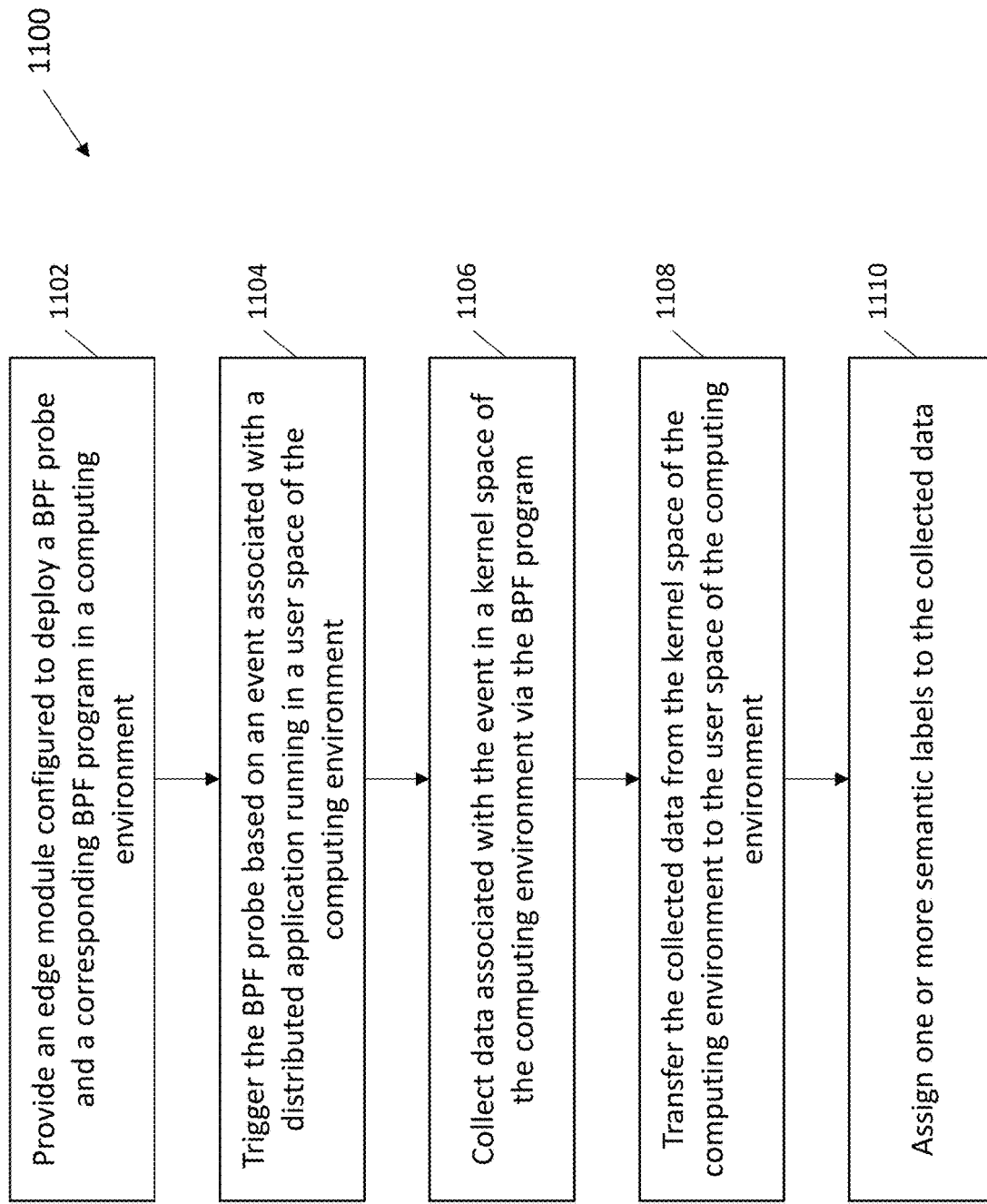
FIG. 11 is a flow diagram of a method for linking and navigating data collected from a distributed application cluster in accordance with aspects described herein.

FIG. 11 is a flow diagram of a method 1100 for linking and navigating data collected from a distributed application cluster in accordance with aspects described herein. In one example, the method 1100 can be carried out, at least in part, by the distributed application monitoring system 900 of FIG. 9.

At block 1102, an edge module is provided and configured to deploy a BPF probe and a corresponding BPF program in a computing environment. In one example, the edge module is configured to run on the computing environment with a distributed application. In some examples, the computing environment corresponds to a node of the distributed application cluster.

At block 1104, the BPF probe is triggered based on an event associated with the distributed application running in a user space of the computing environment. In one example, the event (or events) that trigger the BPF probe are identified in a configuration of the edge module (e.g., a user configuration, system configuration, etc.).

At block 1106, data associated with the event is collected (or captured) in a kernel space of the computing environment via the BPF program.

At block 1108, the collected data is transferred from the kernel space of the computing environment to the user space of the computing environment. In one example, the captured data is transferred from the BPF program to the edge module.

At block 1110, one or more semantic labels are assigned to the collected data. In one example, the collected data is labeled to indicate a source of the data (e.g., source within the distributed application cluster). In some examples, the semantic labels correspond to types of entities supported by each node in the cluster (e.g., node name, pod name, microservice name, etc.).

Data queries including at least one of the semantic labels may be received from a user interface (e.g., CLI 912a or UI 912b). In response, data from the collected data associated with the semantic labels in the query may be returned to the user interface (e.g., via the agent 910 and/or the edge module 908). In some examples, URL links corresponding the collected data can be generated. For example, the URL links may include at least one semantic label assigned to the collected data. In certain examples, the collected data can be displayed (e.g., via UI 912b) in response to a user accessing the URL link(s). In some examples, the collected data is displayed as a data table and/or a graphical visualization (e.g., chart, plot, etc.).

Command Driven Navigation

According to some embodiments, a main-mode for navigating through an interface (e.g., UI 912b) is achieved by typing autocompleted commands. Possible commands that can be entered can vary from navigating to other pages/views, or can perform specific actions on the current page. As the user types, "fuzzy" searches are performed to determine which entities best match what has been typed. Matches are determined by how closely the entity name/description matches the user's input, and how relevant the entity is according to the user's current context. The searchable data can be indexed in order for the searches to be performed quickly. For example, the data can be indexed or filtered by a cluster ID.

In some examples, autocomplete for entity (pod, service, etc.) names is based on context provided from a knowledge graph. The knowledge graph is based on relationships between entities (how much they communicate, how often are they linked together, hierarchical organization) as well as which entities have the most interesting behavior within relevant time windows. This can also include recommending different actions that can be taken depending on the current page and entities involved.

In one example, the views presented to the user are entirely based on code. Such code serves as a "visualization specification" that describes the layout of tables, charts, and other visuals in any given view. In some examples, the view code includes a declarative message format and a PxL script. The PxL script may be a declarative Python script. These views can be registered in a public repository (e.g., GitHub). In some examples, the registered views can be accessed by ID using hyperlinking and keyboard shortcuts. In certain examples, users can extend or modify these views, or register their own views to the public repository.

Figure 12:
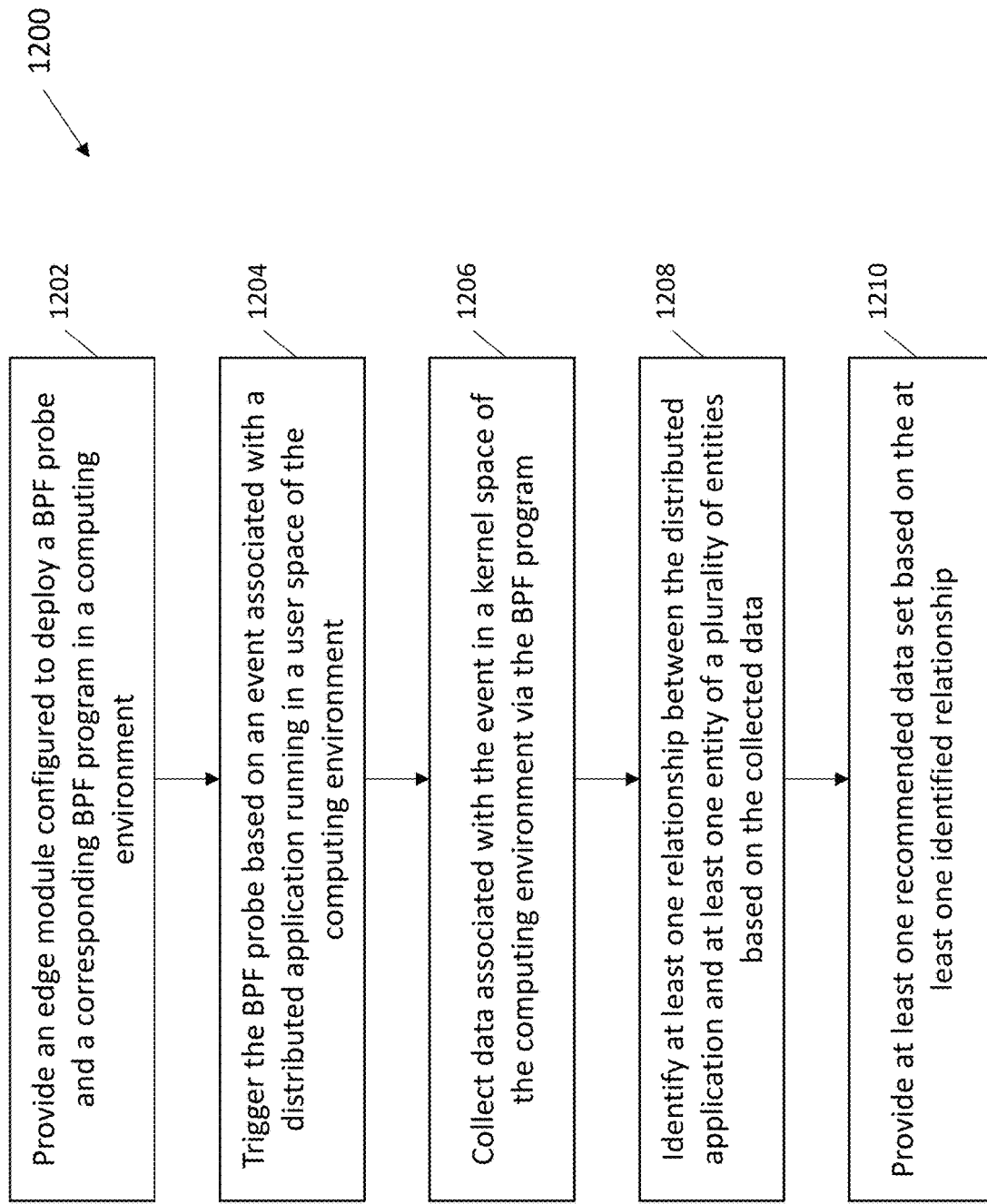
FIG. 12 is a flow diagram of a method for navigating data associated with a distributed application cluster in accordance with aspects described herein.

FIG. 12 is a flow diagram of a method 1200 for navigating data associated with a distributed application cluster in accordance with aspects described herein. In one example, the method 1200 can be carried out, at least in part, by the distributed application monitoring system 900 of FIG. 9.

At block 1202, an edge module is provided and configured to deploy a BPF probe and a corresponding BPF program in a computing environment. In one example, the edge module is configured to run on the computing environment with a distributed application. In some examples, the computing environment corresponds to a node of the distributed application cluster. The distributed application corresponds to one entity of a plurality of entities on the distributed application cluster. The plurality of entities can include nodes, pods, and services (or microservices) running on the distributed application cluster.

At block 1204, the BPF probe is triggered based on an event associated with the distributed application running in a user space of the computing environment. In one example, the event (or events) that trigger the BPF probe are identified in a configuration of the edge module (e.g., a user configuration, system configuration, etc.).

At block 1206, data associated with the event is collected (or captured) in a kernel space of the computing environment via the BPF program. In one example, the collected data is transferred from the BPF program to the edge module.

At block 1208, at least one relationship is identified between the distributed application and at least one entity of the plurality of entities based on the collected data. In one example, identifying the at least one relationship includes generating a knowledge graph from the collected data that represents relationships between the plurality of entities. The relationships represented in the knowledge graph may correspond to interactions between two or more entities of the plurality of entities.

At block 1210, at least one recommended data set is provided (e.g., to a user) based on the at least one identified relationship. In one example, the recommended data set(s) includes at least a portion of the collected data. In some examples, recommended data set(s) include a data table and/or a graphical visualization representing the data set.

In one example, the UI 912b includes a command entry field where users can enter commands to perform various functions with the UI 912b. For example, the commands may instruct the UI 912b to display a data table and/or a graphical visualization representing the recommended data set(s). In some examples, the user may enter a partially completed command. In response, at least one command corresponding to the recommended data set(s) may be suggested (e.g., via a drop down list) based on the partially completed command. In some examples, the suggested command(s) are provided via the edge module (or the agent 910).

Hybrid Architecture

In one example, a hybrid architecture is used to separate control functionality (e.g., operations for handling API requests, overall management of the system) and data functionality (e.g., collecting, managing, and executing queries on data). In some examples, the separation of functionality is split between a self-hosted cloud service and customer environment. In certain examples, data can be processed entirely in the customer environment. Requests pertaining to the data are made to the application(s) running on the customer environment. All other operations (e.g., control functionality) can be handled entirely in the self-hosted cloud service.

Direct Mode for Accessing Data

Figure 13A:
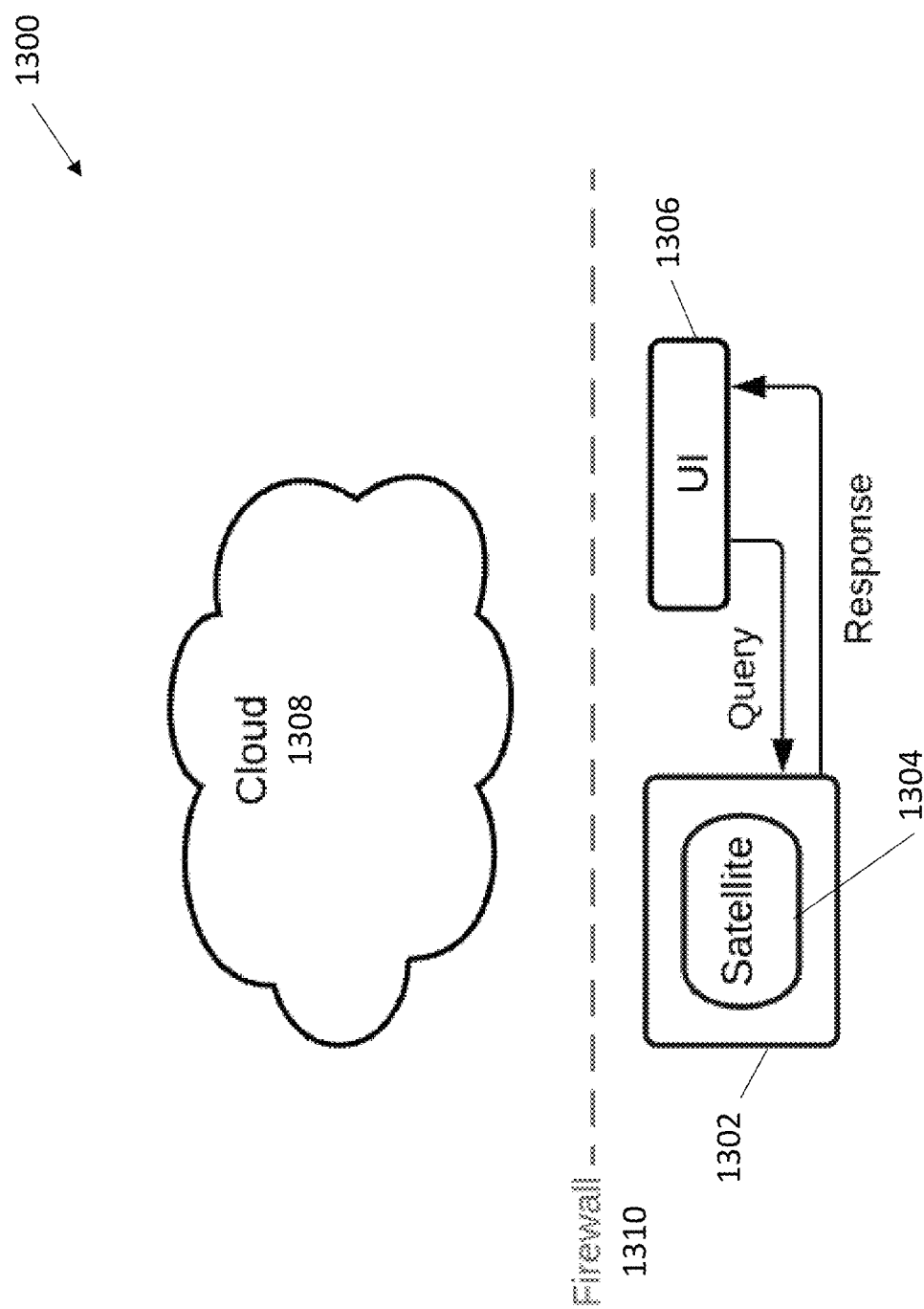
FIG. 13A is a functional block diagram of a hybrid architecture operating in a direct mode of operation in accordance with aspects described herein.

FIG. 13A is a functional block diagram of a hybrid architecture 1300 operating in a direct mode in accordance with aspects described herein. As shown, the hybrid architecture 1300 includes a customer environment 1302, a satellite application 1304, a UI 1306, and a cloud service 1308. In one example, the customer environment 1302 corresponds to a node (e.g., node 122A) of the distributed application cluster 120, the satellite application 1304 corresponds to a distributed application or microservice running on the node (e.g., microservice 228A), and the UI 1306 corresponds to the UI 912b. In some examples, the cloud service 1308 is configured to communicate with the satellite application 1304 via the distributed agent 910. The UI 1306 may communicate with the satellite application 1304 via an API.

In the direct mode, the UI 1306 is configured to send queries (or requests) directly to the satellite application 1304. Likewise, the UI 1306 is configured to receive responses directly from the satellite application 1304. In one example, the UI 1306 is configured to retrieve the address (e.g., IP address) of the satellite application 1304 from the cloud service 1308. In some examples, the UI 1306 may also retrieve a status of the satellite application 1304 (e.g., via a heartbeat sequence). The satellite application 1304 running on the customer environment 1302 may include a proxy service which handles requests. In some examples, the proxy service can be configured to serve pre-generated SSL certificates to satisfy browser security requirements. Being that the UI 1306 communicates directly with the satellite application 1304, data can be kept behind a firewall 1310.

Passthrough Mode for Accessing Data

Figure 13B:
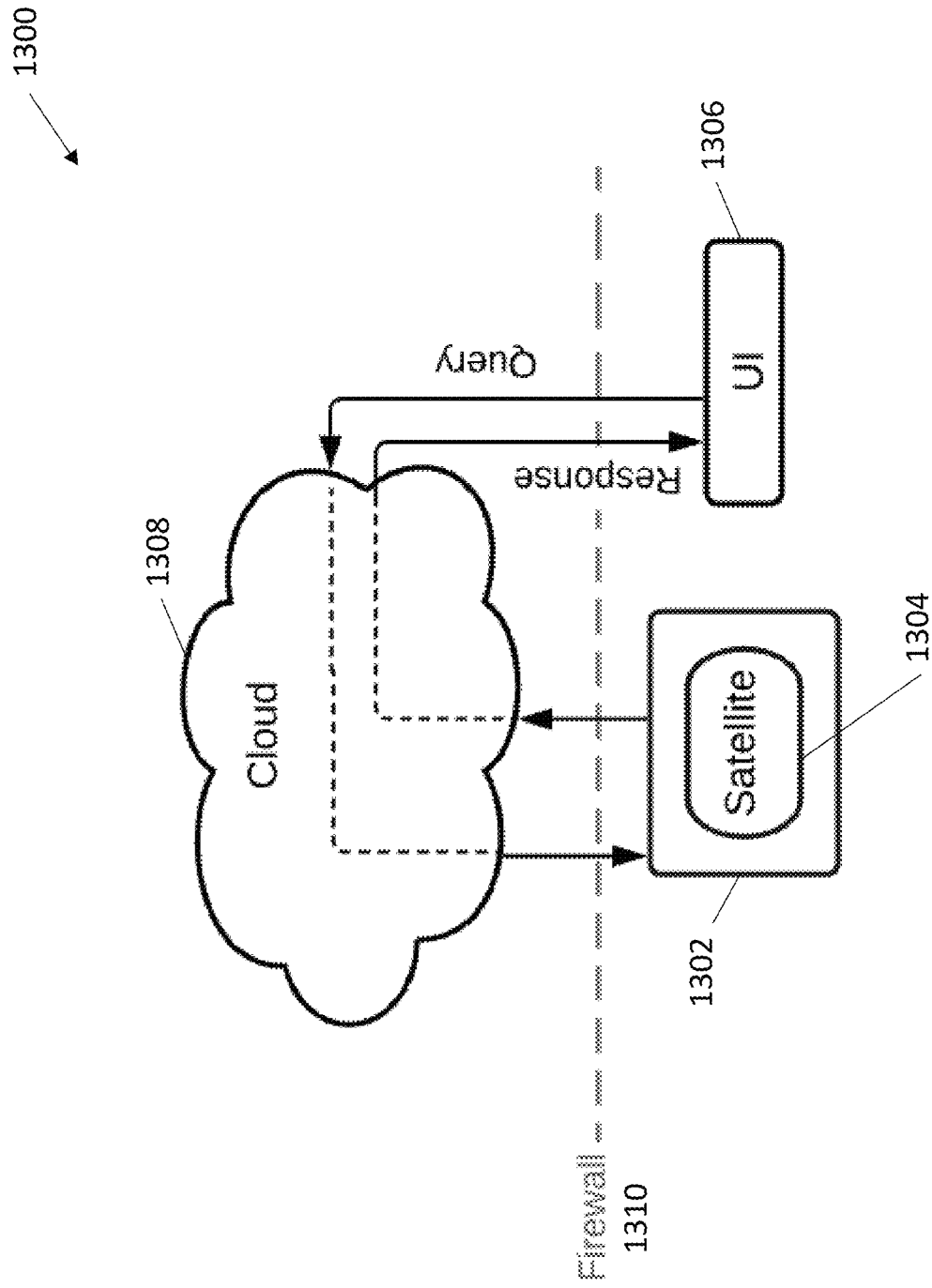
FIG. 13B is a functional block diagram of a hybrid architecture operating in a passthrough mode of operation in accordance with aspects described herein.

FIG. 13B is a functional block diagram of the hybrid architecture 1300 operating in a passthrough mode in accordance with aspects described herein. In the passthrough mode, instead of making the request directly to the satellite application 1304 running on the customer environment 1302, the data request is made to the cloud service 1308. The cloud service 1308 is responsible for forwarding the data request to the customer environment 1302, and subsequently sending any results back to the requestor (i.e., the UI 1306). Being that the data flows through the cloud service 1308, it can be accessed from out-of-network. In some examples, a message-bus based system can be used for proxying messages between the cloud service 1308 and the customer environment 1302. In addition, the message-bus system can be used to direct other control messages to/from the cloud service 1308 and the customer environment 1302. Such control messages can include notifying the customer for upgrades or possible configuration changes.

Hybrid Architecture Operation

Figure 14:
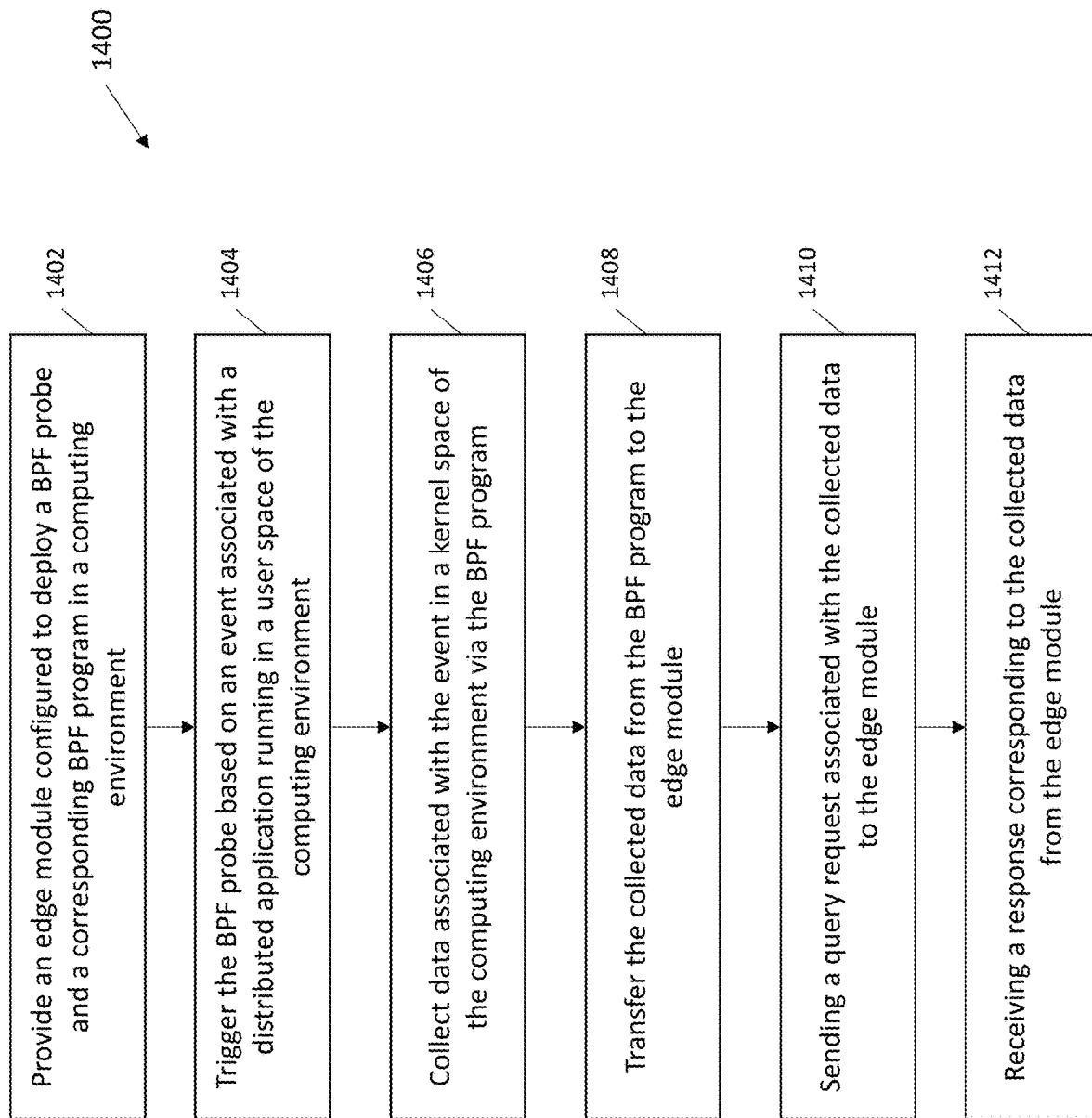
FIG. 14 is a flow diagram of a method for event logging and debugging on a distributed application cluster in accordance with aspects described herein.

FIG. 14 is a flow diagram of a method 1400 for event logging and debugging on a distributed application cluster in accordance with aspects described herein. In one example, the method 1400 corresponds to the operation of the hybrid architecture 1300 in the direct and passthrough modes.

At block 1402, an edge module is provided and configured to deploy a BPF probe and a corresponding BPF program in a computing environment (e.g., customer environment 1302). In one example, the edge module is configured to run on the computing environment with a distributed application (e.g., satellite application 1304). In some examples, the computing environment corresponds to a node of the distributed application cluster. The distributed application may run in a user space of the computing environment.

At block 1404, the BPF probe is triggered based on an event associated with the distributed application. In one example, the event (or events) that trigger the BPF probe are identified in a configuration of the edge module (e.g., a user configuration, system configuration, etc.).

At block 1406, data associated with the event is collected (or captured) in a kernel space of the computing environment via the BPF program.

At block 1408, the collected data from the BPF program to the edge module. In one example, transferring the collected data from the BPF program to the edge module includes transferring the collected data from the kernel space of the computing environment to the user space of the computing environment.

At block 1410, a query request associated with the collected data is sent via UI 1306 to the edge module. In the direct mode, the cloud service 1308 may query an address (e.g., IP address) associated with the distributed application (or the computing environment). The UI 1306 may request the address associated with the distributed application (or the edge module) from the cloud service 1308 and send the query request directly to the address. Likewise, in the passthrough mode, the UI 1306 sends the query request to the cloud service 1308 and the cloud service 1308 directs (or forwards) the query request to the edge module of the distributed application.

At block 1412, a response corresponding to the collected data is received from the edge module at the UI 1306. In one example, the response includes at least a portion of the collected data. In the direct mode, the cloud service 1308 may receive the request directly from the distributed application. Likewise, in the passthrough mode, the distributed application provides the response to the cloud service 1308 and the cloud service 1308 directs (or forwards) the response to the UI 1306. In some examples, the UI 1306 is configured to generate a data table and/or a graphical visualization based on the received response corresponding to the collected data.

Hardware and Software Implementations

Figure 15:
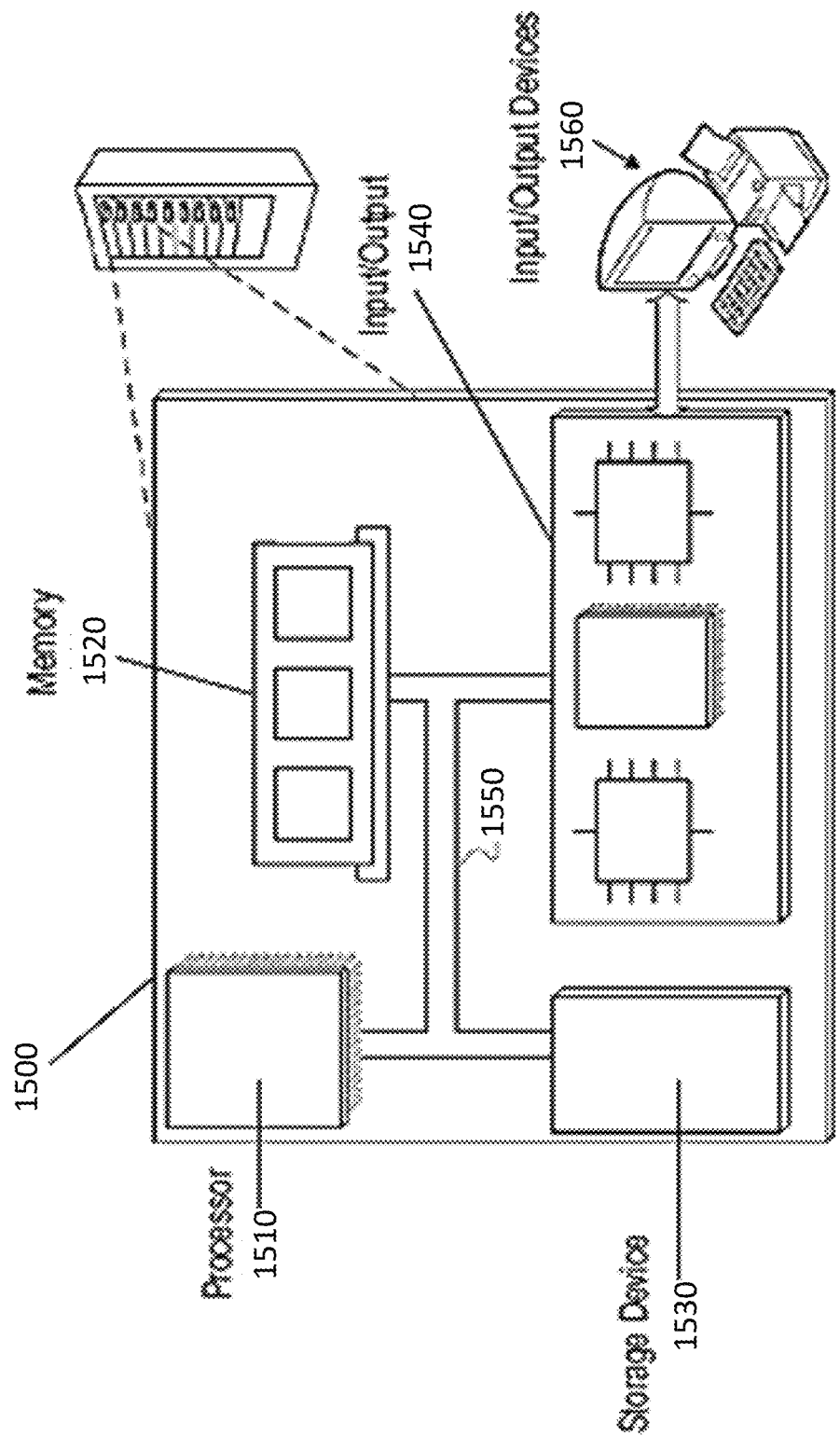
FIG. 15 is a block diagram of an example computer system in accordance with aspects described herein.

FIG. 15 is a block diagram of an example computer system 1500 that may be used in implementing the systems and methods described herein. General-purpose computers, network appliances, mobile devices, or other electronic systems may also include at least portions of the system 1500. The system 1500 includes a processor 1510, a memory 1520, a storage device 1530, and an input/output device 1540. Each of the components 1510, 1520, 1530, and 1540 may be interconnected, for example, using a system bus 1550. The processor 1510 is capable of processing instructions for execution within the system 1500. In some implementations, the processor 1510 is a single-threaded processor. In some implementations, the processor 1510 is a multi-threaded processor. The processor 1510 is capable of processing instructions stored in the memory 1520 or on the storage device 1530.

The memory 1520 stores information within the system 1500. In some implementations, the memory 1520 is a non-transitory computer-readable medium. In some implementations, the memory 1520 is a volatile memory unit. In some implementations, the memory 1520 is a non-volatile memory unit. In some examples, some or all of the data described above can be stored on a personal computing device, in data storage hosted on one or more centralized computing devices, or via cloud-based storage. In some examples, some data are stored in one location and other data are stored in another location. In some examples, quantum computing can be used. In some examples, functional programming languages can be used. In some examples, electrical memory, such as flash-based memory, can be used.

The storage device 1530 is capable of providing mass storage for the system 1500. In some implementations, the storage device 1530 is a non-transitory computer-readable medium. In various different implementations, the storage device 1530 may include, for example, a hard disk device, an optical disk device, a solid-date drive, a flash drive, or some other large capacity storage device. For example, the storage device may store long-term data (e.g., database data, file system data, etc.). The input/output device 1540 provides input/output operations for the system 1500. In some implementations, the input/output device 1540 may include one or more of a network interface devices, e.g., an Ethernet card, a serial communication device, e.g., an RS-232 port, and/or a wireless interface device, e.g., an 802.11 card, a 3G wireless modem, or a 4G wireless modem. In some implementations, the input/output device may include driver devices configured to receive input data and send output data to other input/output devices, e.g., keyboard, printer and display devices 1560. In some examples, mobile computing devices, mobile communication devices, and other devices may be used.

In some implementations, at least a portion of the approaches described above may be realized by instructions that upon execution cause one or more processing devices to carry out the processes and functions described above. Such instructions may include, for example, interpreted instructions such as script instructions, or executable code, or other instructions stored in a non-transitory computer readable medium. The storage device 1530 may be implemented in a distributed way over a network, such as a server farm or a set of widely distributed servers, or may be implemented in a single computing device.

Although an example processing system has been described in FIG. 15, embodiments of the subject matter, functional operations and processes described in this specification can be implemented in other types of digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "system" may encompass all kinds of apparatus, devices, and machines for processing data, including by way of example a programmable processor, a computer, or multiple processors or computers. A processing system may include special purpose logic circuitry, e.g., an FPGA (field programmable gate array) or an ASIC (application specific integrated circuit). A processing system may include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program can include, by way of example, general or special purpose microprocessors or both, or any other kind of central processing unit. Generally, a central processing unit will receive instructions and data from a read-only memory or a random access memory or both. A computer generally includes a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

As described above, systems and methods for providing automation solutions for event logging and debugging on container orchestration platforms are provided herein. In at least one embodiment, the automated solutions include event logging and debugging on the KUBERNETES platform. In some examples, the solutions include the use of no-instrumentation telemetry, an edge intel platform, entity linking and navigation, command driven navigation, and a hybrid-cloud/customer architecture.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated from the described processes. Accordingly, other implementations are within the scope of the following claims.

The phraseology and terminology used herein is for the purpose of description and should not be regarded as limiting.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A system for event logging and debugging on a distributed application cluster, the system comprising:
   a user interface;
   at least one memory storing computer-executable instructions; and
   at least one processor for executing the computer-executable instructions stored in the memory, wherein the instructions, when executed, instruct the at least one processor to:
      provide an edge module executing in a user space of a computing environment comprising the at least one memory and the at least one process, the edge module configured to deploy a Berkeley Packet Filter (BPF) probe and a corresponding BPF program in a kernel space of the computing environment;
      trigger the BPF probe based on an event associated with a distributed application running in the user space of the computing environment;
      collect data associated with the event in the kernel space of the computing environment via the BPF program;
      transfer the collected data from the BPF program executing in the kernel space to the edge module executing in the user space;
      send, via the user interface, a query request associated with the collected data to the edge module; and
      receive, at the user interface, a response corresponding to the collected data from the edge module.

2. The system of claim 1, wherein the response corresponding to the collected data includes at least a portion of the collected data.

3. The system of claim 1, further comprising a cloud service, wherein the instructions, when executed, further instruct the at least one processor to:
   query, via the cloud service, an address associated with the distributed application; and
   request, via the user interface, the address associated with the distributed application from the cloud service.

4. The system of claim 3, wherein the address associated with the distributed application comprises an IP address of the computing environment executing the edge module, and wherein sending the query request associated with the collected data to the edge module comprises sending the query request directly to the IP address of the computing environment executing the edge module.

5. The system of claim 4, wherein the user interface and the distributed application are on a first side of a firewall and the cloud service is on a second side of the firewall.

6. The system of claim 1, wherein sending the query request associated with the collected data to the edge module includes sending the query request to a cloud service configured to communicate with the edge module.

7. The system of claim 6, wherein receiving the response corresponding to the collected data from the edge module includes receiving the response from the cloud service in communication with the edge module.

8. The system of claim 7, wherein the cloud service can receive query requests and/or send responses over networks other than a network shared between the distributed application and the user interface.

9. The system of claim 1, wherein the instructions, when executed, further instruct the at least one processor to:
   generate at least one of a data table and a graphical visualization based on the received response corresponding to the collected data.

10. A method for event logging and debugging on a distributed application cluster, the method comprising:
- providing an edge module executing in a user space of a computing environment, the edge module configured to deploy a Berkeley Packet Filter (BPF) probe and a corresponding BPF program in a kernel space of the computing environment;
- triggering the BPF probe based on an event associated with a distributed application running in the user space of the computing environment;
- collecting data associated with the event in the kernel space of the computing environment via the BPF program;
- transferring the collected data from the BPF program executing in the kernel space to the edge module executing in the user space;
- sending, via a user interface, a query request associated with the collected data to the edge module; and
- receiving, at the user interface, a response corresponding to the collected data from the edge module.

11. The method of claim 10, wherein the response corresponding to the collected data includes at least a portion of the collected data.

12. The method of claim 10, further comprising:
- querying, via a cloud service, an address associated with the distributed application; and
- requesting, via the user interface, the address associated with the distributed application from the cloud service.

13. The method of claim 12, wherein the address associated with the distributed application comprises an IP address of the computing environment executing the edge module, and wherein sending the query request associated with the collected data to the edge module comprises sending the query request directly to the IP address of the computing environment executing the edge module.

14. The method of claim 13, wherein the user interface and the distributed application are on a first side of a firewall and the cloud service is on a second side of the firewall.

15. The method of claim 10, wherein sending the query request associated with the collected data to the edge module includes sending the query request to a cloud service configured to communicate with the edge module.

16. The method of claim 15, wherein receiving the response corresponding to the collected data from the edge module includes receiving the response from the cloud service in communication with the edge module.

17. The method of claim 16, wherein the cloud service can receive query requests and/or send responses over networks other than a network shared between the distributed application and the user interface.

18. The method of claim 10, further comprising:
- generating at least one of a data table and a graphical visualization based on the received response corresponding to the collected data.

* * * * *